(12) United States Patent
Iwanaga et al.

(10) Patent No.: US 8,212,869 B2
(45) Date of Patent: Jul. 3, 2012

(54) SUBSTRATE INSPECTION METHOD, SUBSTRATE INSPECTION SYSTEM AND STORAGE MEDIUM

(75) Inventors: Shuji Iwanaga, Koshi (JP); Kazuya Hisano, Koshi (JP)

(73) Assignee: Tokyo Electron Limited, Minato-Ku (JP)

( * ) Notice: Subject to any disclaimer, the term of this patent is extended or adjusted under 35 U.S.C. 154(b) by 422 days.

(21) Appl. No.: 12/620,683

(22) Filed: Nov. 18, 2009

(65) Prior Publication Data

US 2010/0141755 A1    Jun. 10, 2010

(30) Foreign Application Priority Data

Dec. 5, 2008    (JP) .................................. 2008-311432

(51) Int. Cl.
*H04N 7/18* (2006.01)
(52) U.S. Cl. ................. 348/94; 348/87; 348/95
(58) Field of Classification Search .................. None
See application file for complete search history.

(56) References Cited

U.S. PATENT DOCUMENTS

| | | | | |
|---|---|---|---|---|
| 6,363,168 B1 * | 3/2002 | Kakuma | ................. | 382/151 |
| 6,915,006 B2 * | 7/2005 | Beaty et al. | ................. | 382/145 |
| 7,656,425 B2 * | 2/2010 | Tobiason et al. | ................. | 348/187 |
| 7,702,131 B2 * | 4/2010 | Chinen et al. | ................. | 382/103 |

FOREIGN PATENT DOCUMENTS

| | | |
|---|---|---|
| JP | 2007-093330 A1 | 4/2007 |
| JP | 2007-240519 A1 | 9/2007 |

OTHER PUBLICATIONS

"Three-Dimensional Vision." JP Kyoritsu Shuppan, Dec. 25, 2006, pp. 7-14 and 79-83.

* cited by examiner

*Primary Examiner* — John B. Walsh
(74) *Attorney, Agent, or Firm* — Burr & Brown

(57) ABSTRACT

A substrate inspection method capable of accurately inspecting a substrate is provided. A jig having reference points represented by known coordinates in a three-dimensional world coordinate system is photographed by a camera and coordinates of the reference points in a pixel image coordinate system defined by pixels of an image forming device is determined. The coordinates in the pixel image coordinate system are transformed into those in a camera coordinate system set on the camera, and world-camera coordinate system transformation parameters are calculated. Image data in the pixel image coordinate system obtained by photographing a substrate to be inspected is transformed into image data in a world coordinate system for inspection. The accurate inspection of the substrate to be inspected can be achieved because distortion in the image of the substrate to be inspected in the world coordinate system attributable to the position and attitude of the camera is reduced.

9 Claims, 17 Drawing Sheets

WORLD COORDINATE SYSTEM $(X_W, Y_W, Z_W)$
↓
CAMERA COORDINATE SYSTEM $(X_C, Y_C, Z_C)$
↓
IMAGE COORDINATE SYSTEM $(u, v)$
↓
PIXEL IMAGE COORDINATE SYSTEM $(r, c)$
↓
DISPLAYING ON THE OUTPUT SCREEN

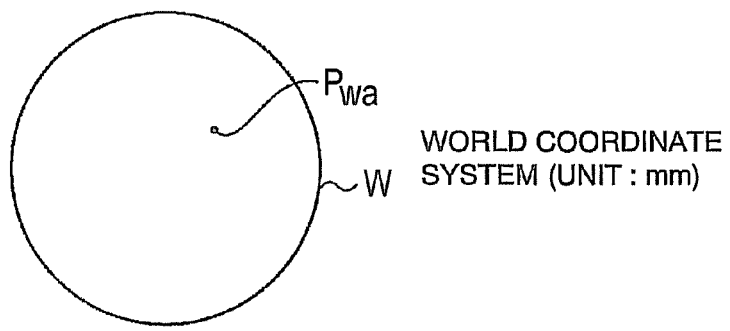
FIG. 5A — WORLD COORDINATE SYSTEM (UNIT : mm)
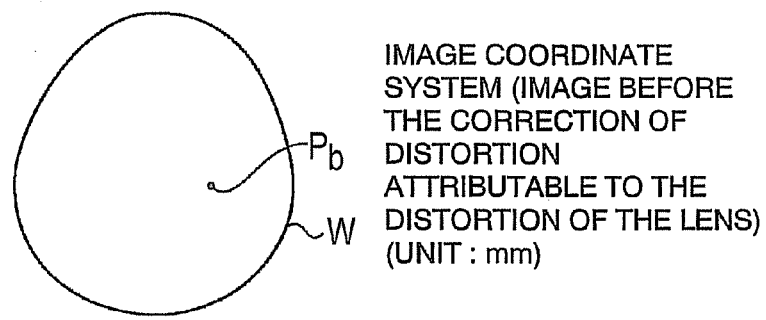
FIG. 5B — IMAGE COORDINATE SYSTEM (IMAGE BEFORE THE CORRECTION OF DISTORTION ATTRIBUTABLE TO THE DISTORTION OF THE LENS) (UNIT : mm)
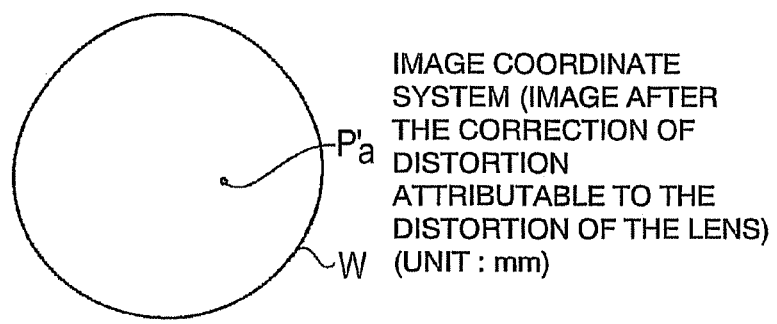
FIG. 5C — IMAGE COORDINATE SYSTEM (IMAGE AFTER THE CORRECTION OF DISTORTION ATTRIBUTABLE TO THE DISTORTION OF THE LENS) (UNIT : mm)
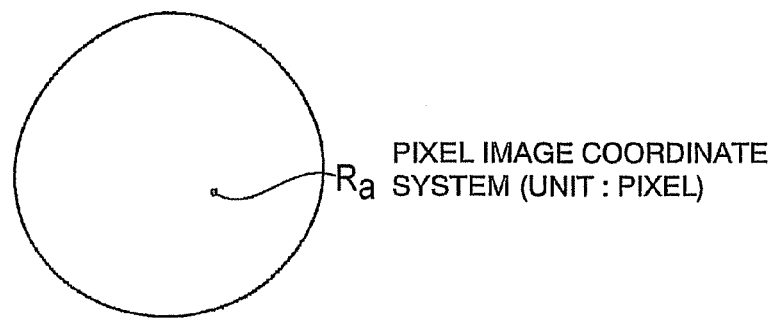
FIG. 5D — PIXEL IMAGE COORDINATE SYSTEM (UNIT : PIXEL)

0°

90°

180°

270°

SUBSTRATE INSPECTION METHOD, SUBSTRATE INSPECTION SYSTEM AND STORAGE MEDIUM

BACKGROUND OF THE INVENTION

1. Field of the Invention

The present invention relates to a substrate inspection method that takes an image of a substrate, such as a semiconductor wafer, a substrate for a LCD, namely, a glass substrate for a liquid crystal display, for inspection, a substrate inspection system and a storage medium.

2. Description of the Related Art

A photolithographic process for fabricating a semiconductor device includes a coating process of coating a semiconductor wafer W (hereinafter, referred to simply as "wafer W), with a resist film, an exposure process of forming a predetermined pattern with optical radiation in the resist film, and a developing process of processing the exposed resist film to form a predetermined resist pattern. Those processes are carried out sequentially to form the predetermined resist pattern on the wafer W.

The wafer W processed by the series of photographic processes is carried into an inspection module included in a coating and developing system that carries out the coating and the developing process. A camera disposed in the inspection module forms an image of the surface of the wafer W. The image is displayed on an output screen. The picture displayed on the output screen is inspected for a macro defect inspection to see if the resist film is formed in a desired shape on the wafer W, to see if any defects are formed in the surface of the resist film and to see if any dust particles are sticking to the surface of the resist film. The construction of such an inspection module is mentioned in JP-A 2007-240519 (FIG. 4).

FIG. 16 shows a camera 1, namely, a pinhole camera, and a wafer W to be inspected. The camera1 1 is provided with a lens 11, and an image forming device 12, such as a CCD, having an image forming surface 13. In FIG. 16, a chain line indicates the optical axis of the camera 1, A1 indicates a point where the optical axis intersects the surface of the wafer W, and a two-dot chain line connecting the lens 11 and a point A2 on the wafer W nearest to the lens 11.

Referring to FIG. 16, an image of a part around the point A2 formed by the lens 11 is larger than an image of a part around the point A1. Consequently, a distorted image is formed on the image forming surface 12. A picture corresponding to the image formed by the image forming device 12 and displayed on the output screen is a distorted picture of the wafer W@. Usually, the picture displayed in the output screen is distorted and the degree of distortion is dependent on the three-dimensional relation between the camera 1 and the wafer W. Practically, the distortion of the picture displayed on the output screen is dependent on parameters inherent to the camera as well as on positioning parameters representing the positional relation between the camera 1 and the wafer W. Effects of the inherent parameters of the camera 1 will be described later.

There is the possibility that the accuracy of defect inspection is deteriorated if a greatly distorted image is displayed on the output screen. Therefore, efforts are made to install the camera 1 in the inspection module such that the distortion of the image can be reduced to the least possible extent. A coordinate system shown in FIG. 17 has an origin o at the optical center o of the camera 1, a $Z_c$-axis aligned with the optical axis of the camera 1, and an $X_c$-axis and a $Y_c$-axis perpendicular to the Z-axis. In FIG. 17, $\alpha'$, $\beta'$ and $\gamma'$ are angular displacements about the $X_c$-axis, $Y_c$-axis and the $Z_c$-axis, respectively. Correct positioning of the camera 1 so that the distortion of the image may be reduced to the least possible extent requires the adjustment of positions with respect to the $X_c$-axis, $Y_c$-axis and the $Z_c$-axis, and the angular displacements $\alpha'$, $\beta'$ and $\gamma'$, which needs much time and labor.

Since many positioning parameters need to be adjusted, the positioning parameters representing the respective positions of different cameras adjusted by different operators are liable to be slightly different. Positioning parameters representing the optimum position and attitude of one of the cameras for forming an optimum image cannot be necessarily properly applied to determining the position and attitude of the other cameras for forming an optimum image if different cameras have different parameters, such as the distortion of the lens, respectively. Those problems increase time necessary for installing the camera 1 and can be causes of increase in the degree of distortion of the image and failure in achieving correct inspection.

Defect inspection can be achieved through the examination of the image displayed on the output screen by the operator. Generally, defect inspection is achieved through the comparison of image data on the image of the wafer W formed by the image forming device 12 with reference image data on a reference wafer W having an ideal morphology stored in the storage device of a computer. However, image data obtained by different cameras are different because different cameras have different positioning errors, respectively. Therefore, different substrate inspection systems need to store different reference image data, respectively. If reference image data prepared for a first substrate inspection system is used by a second substrate inspection system, there is the possibility that the computer of the second substrate inspection system mistakenly decide that a practically perfect part of a wafer W is defective. The preparation of different optimum reference image data for different substrate inspection systems requires much work.

In some cases, common reference image data is used by different substrate inspection systems. In such a case, detection sensitivity is lowered to avoid such an incorrect decision and the substrate inspection system tolerates measured image data greatly different from the reference image data and decides an image represented by the measured image data to be acceptable. The substrate inspection system that inspects wafers in such a mode cannot achieve accurate inspection.

Any means for solving those problems is not mentioned in JP-A 2007-240519. JP-A 2007-93330 proposes a technique for correcting the distortion of an image due to errors in the adjustment of the optical system of a substrate inspection system by processing a measured image for correction. However, any method of carrying out the correction is not mentioned in JP-A 2007-93330 and hence the technique cannot solve the foregoing problems.

SUMMARY OF THE INVENTION

The present invention has been made in view of the foregoing problems and it is therefore an object of the present invention to provide a substrate inspection method capable of accurately inspecting a substrate and to provide a storage medium storing a computer program for a computer to execute to carry out the substrate inspecting method.

A substrate inspection method using a substrate inspection system including a camera provided with an image forming device for forming an image of a substrate to be inspected, and a table for supporting the substrate to be inspected for photographing by the camera, the steps of: determining coordinates of reference points represented by known coordinates in a three-dimensional world coordinate system in a jig mounted on the table in an pixel image coordinate system specified by pixels arranged in a matrix in the image forming device by forming an image of the jig by the camera; transforming the coordinates of the reference points in the pixel image coordinate system on the basis of the length and width of the pixels into coordinates in a two-dimensional image coordinate system on an image formed by the camera; transforming the coordinates of the reference points in the two-dimensional image coordinate system into coordinates in a three-dimensional camera coordinate system on the camera by correcting the coordinates of the reference points by using device parameters including parameters of an optical system included in the camera; calculating world-camera coordinate transformation parameters including displacements of the camera coordinate system from the world coordinate system in an X-, a Y- and a Z-direction and angular displacements about an X-, a Y- and a Z-axis on the basis of coordinates of at least six reference points in the camera coordinate system determined by the preceding steps, coordinates of the reference points in the world coordinate system and a world-camera coordinate transformation expression; obtaining image data in the pixel image coordinate system by photographing an substrate to be inspected placed on the table; transforming the image data in the pixel image coordinate system obtained by the preceding step into image data in the two-dimensional image coordinate system on the basis of the length and width of the pixels, transforming the image data in the two-dimensional image coordinate system into image data in the camera coordinate system on the basis of the device parameters, and transforming the image data in the camera coordinate system in the camera coordinate system into image data in the world coordinate system by using the camera-world coordinate transformation expression and the transformation parameters; and inspecting the substrate to be inspected on the basis of the image data in the world coordinate system.

The jig is a correcting substrate having a surface provided with the reference points. When such a correcting substrate is employed, the substrate inspection method includes the steps of turning the correcting substrate to change the angular position thereof from an initial angular position to a new angular position after photographing the correcting substrate at the initial angular position, photographing the correcting substrate set at the new angular position, the coordinates of the reference points in the world coordinate system when the substrate is at the initial angular position and when the substrate is at the new angular position being known, determining coordinates of the reference points in the pixel image coordinate system when the substrate is at the initial angular position and when the substrate is at the new angular position, transforming those coordinates of the reference points into those in the two-dimensional image coordinate system, transforming the coordinates of the reference points in the two-dimensional image coordinate system into those in the camera coordinate system, and calculating the transformation parameters by using the coordinates of the reference points in the camera coordinate system and the those of the reference points in the world coordinate system.

The storage medium of the present invention stores the computer program to be executed by the substrate inspection system to inspect the substrate, and the computer program has a set of instructions for a computer to execute to carry out the substrate inspection method.

According to the present invention, the camera forms the image of the jig provided with the reference points indicated by known coordinates in the three-dimensional world coordinate system, the coordinates of the reference points in the image coordinate system are specified by the pixels of the image forming device, the coordinates of the reference points in the image coordinate system are transformed into the coordinates in the camera coordinate system set on the camera, and the world-camera coordinate transformation parameters are calculated. The image data obtained from the image of the substrate to be inspected formed by the camera in the image coordinate system is transformed into the image data in the world coordinate system by using the calculated transformation parameters for inspection. Since the distortion of the image of the substrate to be inspected in the world coordinate system dependent on the position and attitude of the camera is reduced, the substrate to be inspected can be accurately inspected.

BRIEF DESCRIPTION OF THE DRAWINGS

FIGS. 5A, 5B, 5C and 5D are views of assistance in explaining changes in a wafer image result from coordinate transformation;

BEST MODE FOR CARRYING OUT THE INVENTION

Figure 1:
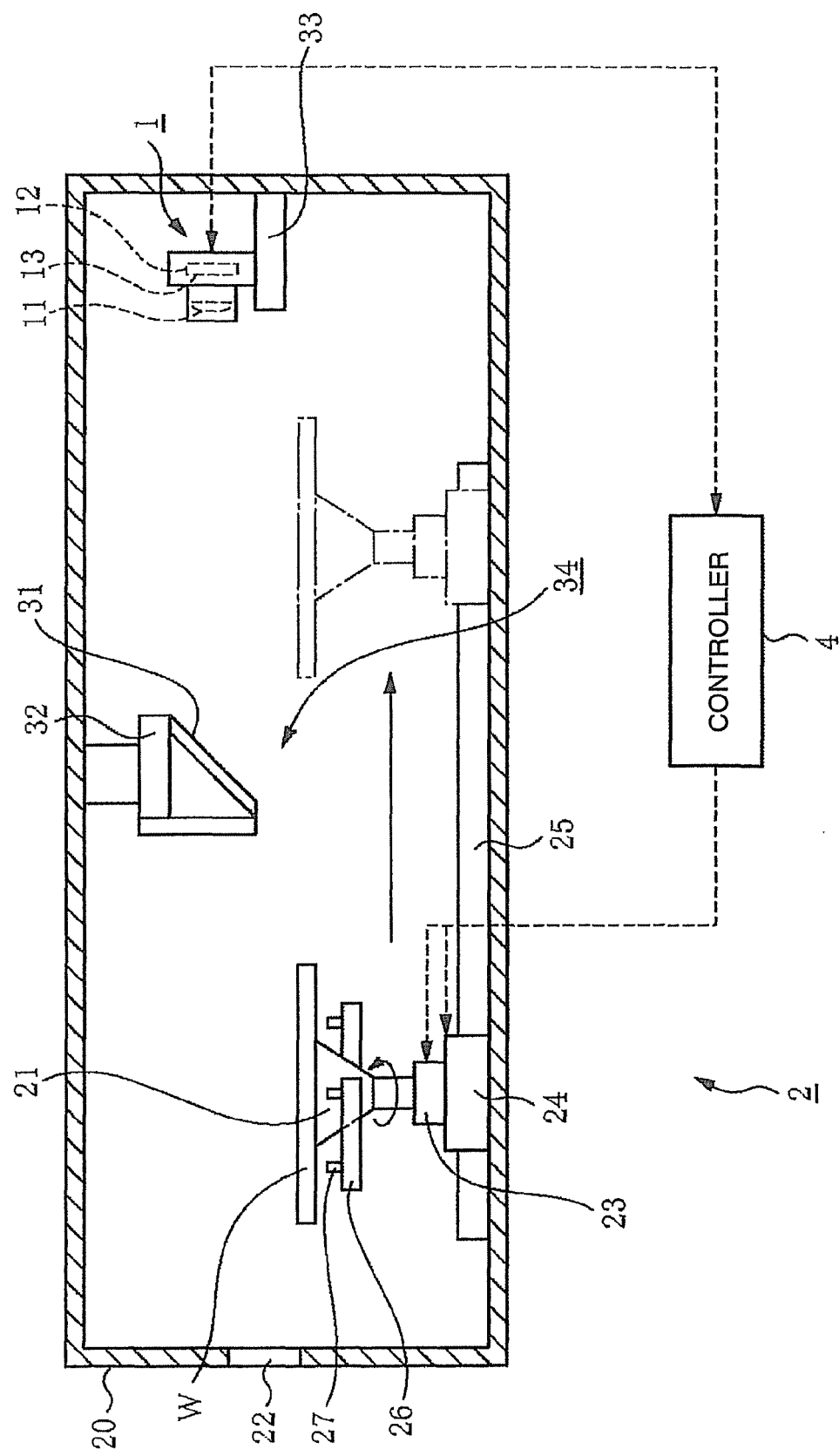
FIG. 1 is a longitudinal sectional view of a substrate inspection system for carrying out a substrate inspection method according to the present invention.
Figure 2:
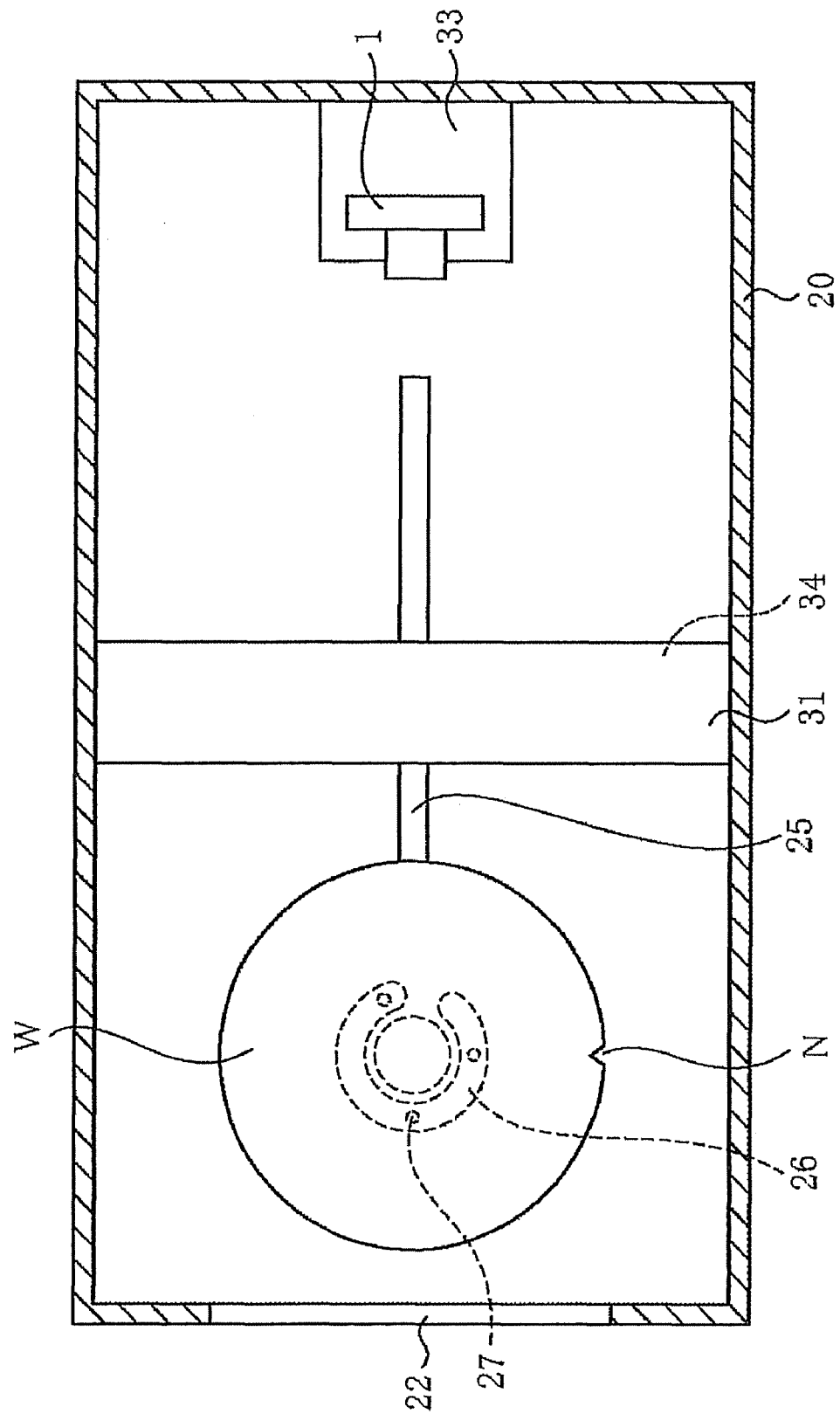
FIG. 2 is a sectional plan view of the substrate inspection system shown in FIG. 1.

A substrate inspection system 2 for carrying out a substrate inspection method according to the present invention will be described. FIGS. 1 and 2 are a longitudinal sectional view and a sectional plan view, respectively of the substrate inspection system 2. The substrate inspection system 2 has a housing box 20 and a chuck 21, namely, a support table, placed in the housing box 20. The chuck 21 attracts a central part of the back surface of a wafer W to hold the wafer W thereon in a horizontal position. The housing box 20 has a front wall provided with an opening through which a wafer W is carried into and carried out of the housing box 20.

A rotational drive device 23 is connected to the chuck 21. The rotational drive device 23 rotates the chuck 21 holding a wafer W about a vertical axis according to a control signal give thereto by a controller 4. The rotational drive device 23 is supported on a linear drive device 24. A horizontal guide rail 25 is extended in the housing box 20 between a position near an opening 22 and a position far from the opening 22. The linear drive device 24 can move horizontally along the guide rail 25. The liner drive device 24 moves together with the rotational drive device 2 and the chuck 21 according to a control signal given thereto by the controller 4.

A lifting member 26 having a shape resembling the letter C in a plane is provided with three lifting pins 27. The lifting pins 27 project vertically upward from the upper surface of the lifting member 26. The lifting member 26 can be vertically moved by a lifting mechanism, not shown. The lifting member 26 is moved vertically to transfer a wafer W between a carrying mechanism, not shown, that carries a wafer through the opening 21 into and out of the housing box 20, and the lifting pins 27.

A semitransparent mirror 31 is extended above the guide rail 25 so as to extend across the guide rail 25. The semitransparent mirror 31 is inclined at an angle to a direction parallel to the guide rail 25. An illuminating device 32 is disposed above the semitransparent mirror 31 to project light down through the semitransparent mirror 21.

A camera 1 like the one mentioned in the description of the prior art is held on the rear wall of the housing box 20 behind the semitransparent mirror 31. The camera 1 has a lens 11 and an image forming device 12, such as a CCD. The camera 1 is mounted on a stage 33. The camera 1 is disposed such that the camera 1 can photograph an entire wafer W when the wafer W is moved. The camera 1 sends image data obtained by photographing a wafer W to the controller 4 in response to a control signal provided by the controller 4.

The illuminating device 32 illuminates an illumination area 34 under the semitransparent mirror 31 through the semitransparent mirror 31. Light reflected by an illuminated object in the illumination area 34 is reflected toward the camera 1. Thus, the camera 1 can photograph the object placed in the illumination area 34. The camera photographs a wafer W intermittently according to a control signal provided by the controller 4 while the wafer W is moved backward under the semitransparent mirror 31 to photograph the entire surface of the wafer W.

Figure 3:
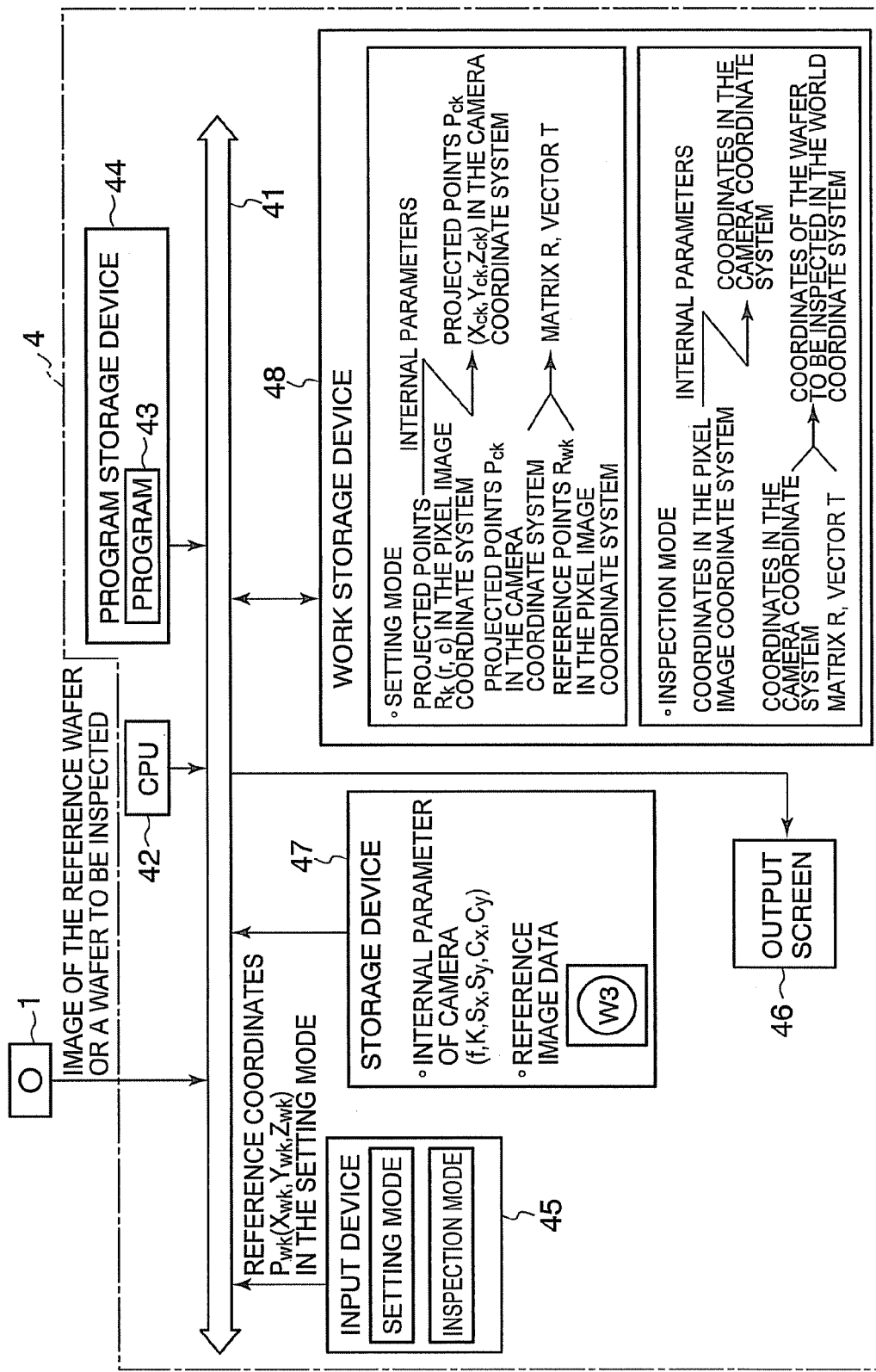
FIG. 3 is a block diagram of a controller included in the substrate inspection system shown in FIG. 1.

The controller 4 is, for example, a computer. The controller 4 will be described with reference to FIG. 3. The controller 4 has a bus 41. A CPU 42 and a program storage device 44 storing a program 43 are connected to the bus 41. The program 43 has a set of instructions for the controller 4 to execute to carry out processes, which will be described later, by sending control signals to the component parts of the substrate inspection system 2. The program storage device 44 is, for example, a flexible disk, a compact disk, a hard disk or a magnetooptical disk (MO). The program storage device 44 storing the program 43 is loaded into the controller 4.

Figure 4:
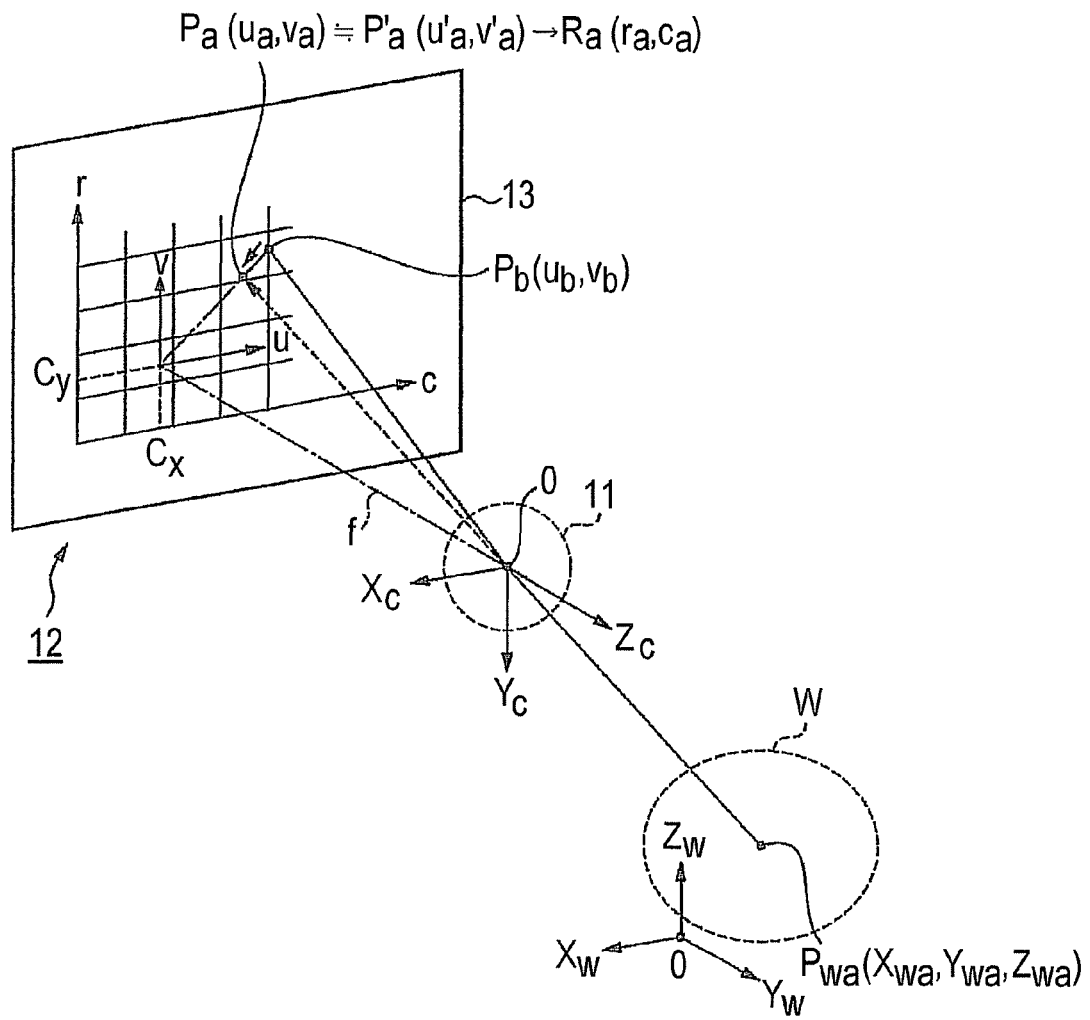
FIG. 4 is a view of assistance in explaining the concept of the transformation of coordinates of images of points formed by a camera.

The controller 4 will be described with reference to FIG. 4 showing the camera 1 in a diagrammatic perspective view. A procedure for processing optical data on an optional point on a wafer W obtained by the camera 1, i.e., a pinhole camera, to transform the optical data into image data will be described with reference to FIG. 4. A three-dimensional external coordinate system in which the camera is disposed has an origin O, an X-axis, a Y-axis and a Z-axis. The X-axis, the Y-axis and the Z-axis are perpendicular to each other. This three-dimensional coordinate system will be called a world coordinate system $X_w Y_w Z_w$. A three-dimensional coordinate system shown in FIG. 4 having an $X_c$-axis, a $Y_c$-axis and a $Z_c$-axis has its origin o at the optical center o of the lens 11 of the camera 1. This coordinate system will be called a camera coordinate system $X_c Y_c Z_c$. The optical axis of the lens 11 is aligned with the $Z_c$-axis. The $Y_c$-axis and the $Z_c$-axis are perpendicular to the $Z_c$-axis. FIG. 5A shows a surface of a wafer W disposed in the world coordinate system $X_w Y_w Z_w$.

Light from an optional point $P_{wa}$ ($X_{wa}$, $Y_{wa}$, $Z_{wa}$) on the surface of the wafer W in the world coordinate system $X_w Y_w Z_w$ travels through the origin o of the camera coordinate system $X_c Y_c Z_c$ and falls on an image forming surface 13 of the image forming device 12 in a two-dimensional image coordinate system uv having a u-axis and a v-axis. The two-dimensional image coordinate system uv is in the image forming surface 13 perpendicular to the Z-axis of the camera coordinate system $X_c Y_c Z_c$ and at a distance f from the origin o of the camera coordinate system $X_C Y_C Z_C$. The u-axis and the v-axis are parallel to the $X_c$-axis and the $Y_c$-axis of the camera coordinate system $X_c Y_c Z_c$, respectively.

A point in the image coordinate system uv at which the $Z_c$-axis intersects a plane defined by the u-axis and the v-axis is the principal point ($c_x$ $c_y$) of an image. The principal point ($c_x$ $c_y$) is the center of radial distortion of an image. FIG. 5B shows an image of the wafer W shown in FIG. 5A formed on the image forming device 12 by way of example. Actually, the camera 1 intermittently picks up images of parts of a wafer W moving in a moving direction. Therefore, images of parts of the wafer W sequentially formed on the image forming surface 13 of the image forming device 12, and the images are displayed sequentially on in order of photographing time in a display area in an output screen 46 to display an image of the wafer W. In FIGS. 4 to 7, it is supposed, to facilitate explanation, that the camera 1 forms an image of a whole wafer W at a time, the image of the whole wafer W is formed on the image forming surface 13 of the image forming device and the image of the while wafer W is displayed on the output screen 46.

When the lens 11 is not distorted, the image of a point $P_{wa}$ is formed at a point $P_a(u_a, v_a)$ in the image coordinate system uv where an extension, indicated by dotted line in FIG. 4, of a line connecting the point $P_{wa}$ and the optical center o of the lens 1 intersects the image forming surface 13. Actually, since the lens 11 is distorted, the image is formed at a point $P_b(u_b, v_b)$ apart from the point $P_a(u_a, v_a)$. The displacement of the point $P_b(u_b, v_b)$ from the point $P_a(u_a, v_a)$ and the direction of the displacement are dependent on the distortion of the lens 11. The controller 4 controls correction parameters for correcting the displacement to correct the distortion resulting from the distortion of the lens 11. An image shown in FIG. 5B is supposed to be formed in an image shown in FIG. 5C on the image forming surface 13, and the point $P_b$ is supposed to be formed at appoint $P'(u'_a, v'_a)$ approximately coinciding with the point $P_a$.

Measurements in the world coordinate system $X_w y_w Z_w$, the camera coordinate system $X_c Y_c Z_c$ and the image coordinate system uv are expressed in millimeters. Data in the image coordinate system uv is transformed into data in a pixel image coordinate system rc in which measurements are expressed in pixels arranged in a matrix in the image forming device 12 to display the data in the image coordinate system uv on the output screen 46. A point $R_a(r_a, C_a)$ shown in FIGS. 4 and 5D is a point in the pixel image coordinate system rc obtained by transforming the point $P'_a(u'_a, v'_a)$ in the image coordinate system uv. The r-axis and the c-axis of the pixel image coordinate system rc are parallel to the u-axis and the v-axis of the image coordinate system uv, and directions in which the pixels are arranged, respectively.

The coordinates of a point in the world coordinate system $X_w Y_w Z_w$, the coordinates of a point in the camera coordinate system $X_c Y_c Z_c$, coordinates of a point in the image coordinate system uv and the pixel image coordinate system rc correspond to each other. A wafer W in the world coordinate system $X_w Y_w Z_w$ is transformed into an image of the pixel image coordinate system rc. An image corresponding to the image in the pixel image coordinate system rc is displayed in the predetermined display area on the output screen according to a selected processing mode.

Parameters for transforming coordinates among the image pixel coordinate system rc, the image coordinate system uv and the camera coordinate system $X_c Y_c Z_c$ are assigned beforehand to the substrate inspection system 2. Processes to be carried out by the substrate inspection system 2 will be described. The substrate inspection system 2 operates in two processing modes, namely, a setting mode and an inspection mode. In the setting mode, an image of a reference wafer W1 having a reference point represented by known coordinates in the world coordinate system $X_w Y_w Z_w$ is formed. The coordinates of a projected point in the pixel image coordinate system rc corresponding to the reference point are transformed into those of the projected point in the camera coordinate system $X_c Y_c Z_c$. Transformation parameters for transformation expressions for coordinate transformation are determined by calculation using the coordinates of the projected point in the camera coordinate system $X_c Y_c Z_c$ and the coordinates of the reference point in the world coordinate system $X_w Y_w Z_w$. Those transformation parameters are displacements of coordinates in the camera coordinate system $X_c Y_c Z_c$ in directions along the X-direction, Y-direction and Z-direction and angular displacements abut the X-axis, the Y-axis and the Z-axis.

When the substrate inspection system 2 operates in the inspection mode, an image of a wafer W2 to be inspected is formed for macro defect inspection. The wafer W2 to be inspected is obtained by processing a wafer W by coating and developing processes and has a resist pattern thereon. Processes for transforming an image in the pixel image coordinate system rc into an image in the image coordinate system uv and transforming the image in the image coordinate system uv into an image in the camera coordinate system $X_c Y_c Z_c$ are carried out sequentially. The image in the camera coordinate system $X_c Y_c Z_c$ is transformed in an image in the world coordinate system $X_w Y_w Z_w$ by using the parameters calculated in the inspection mode. Thus, the image in the world coordinate system $X_w Y_w Z_w$ is obtained; that is, the image in the camera coordinate system $X_c Y_c Z_c$ is transformed into an image not distorted due to the attitude of the camera 1. The image expressed in millimeters in the world coordinate system $X_w Y_w Z_w$ is transformed into a pixel image. The pixel image is displayed on the output screen 46. The pixel image is compared with a reference image stored in the controller 4 to detect defects.

Figure 6:
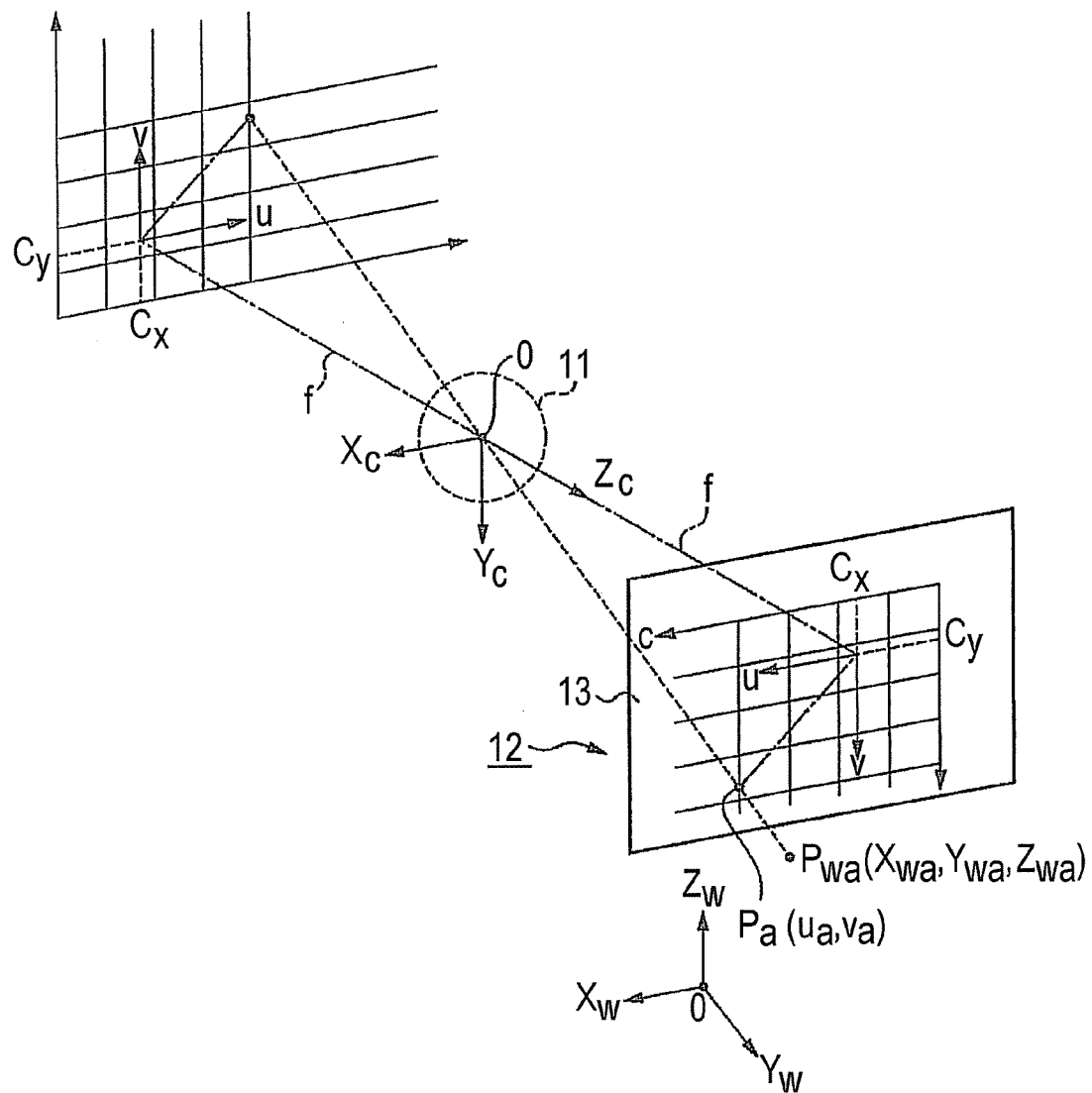
FIG. 6 is a view of assistance in explaining changes in a wafer image result from coordinate transformation.

In the foregoing description, it is supposed that the image forming surface 13 of the image forming device 12 is behind the lens 11 of the camera 1 as shown in FIG. 4. The expressions for coordinate transformation among those coordinate systems are simplified when it is considered that the image forming device 12 is on the front side of the optical center o at a distance f from the optical center o as shown in FIG. 6 because the projected image is not inverted. Expressions used in the following description for coordinate transformation among those coordinate systems is formed on an assumption that the image forming device 12 is disposed as shown in FIG. 6.

Figure 7:
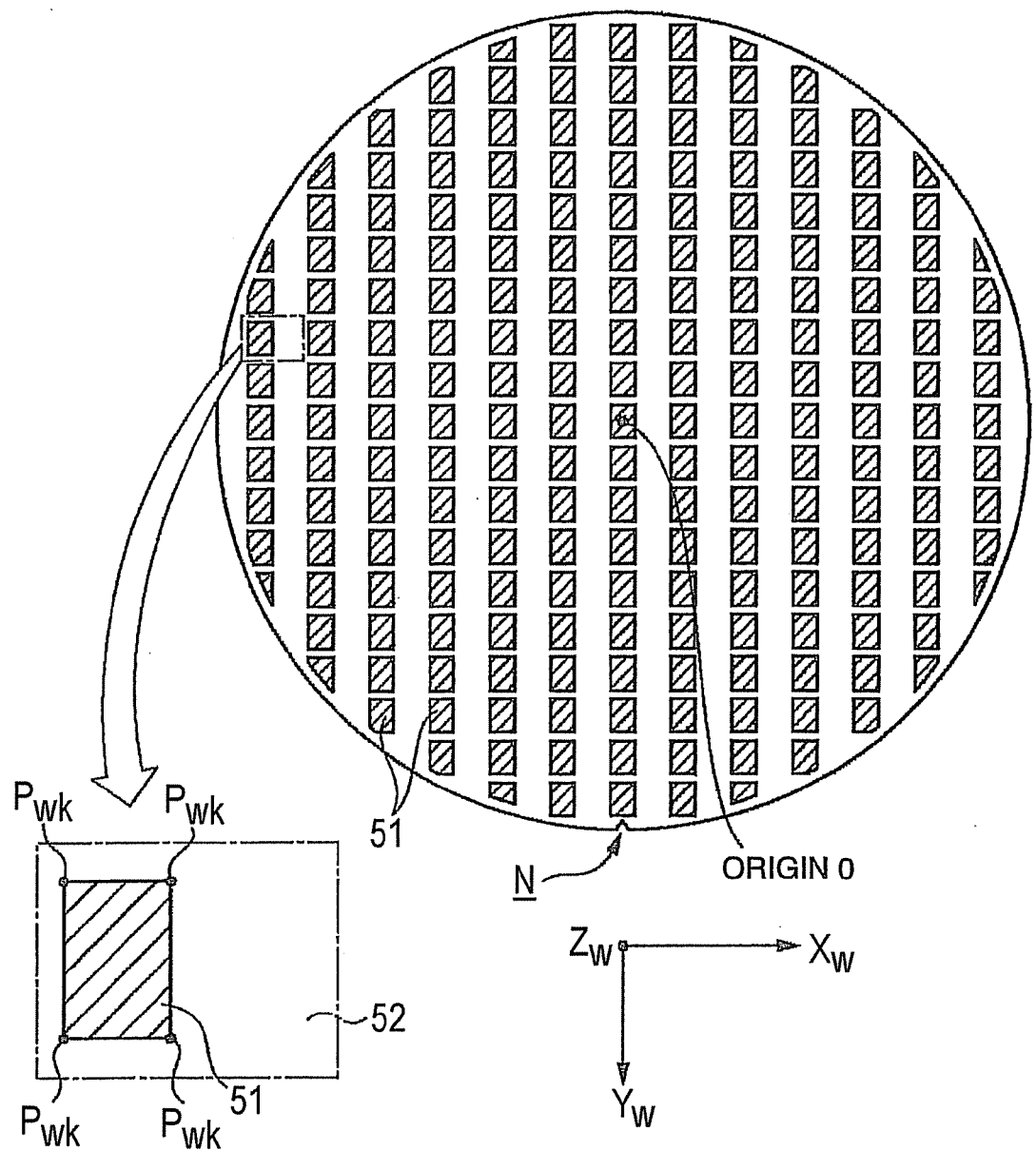
FIG. 7 is a view of assistance in explaining the concept of coordinate transformation of images of points to calculate by using expressions in a preferred embodiment.

FIG. 7 shows a surface of the reference wafer W1 to be used in the setting mode. Many rectangular areas 51 demarcated by areas 52 are arrange in lines and columns. The rectangular areas 51 and the areas 52 are formed such that contrast between the rectangular areas 51 and the areas 52 is higher than a predetermined value so that the coordinates of the projected point corresponding to the reference point can be determined on the basis of the contrast between those areas 51 and 52. For example, the rectangular areas 51 are black and the areas 52 are yellow. In FIG. 7, the rectangular areas 51 are hatched to express contrast between the rectangular areas 51 and the areas 52; the hatched rectangular areas 51 do not indicate sections. A notch N is formed in the edge of the reference wafer W1 in the direction of the length of the rectangular areas 51. One of the rectangular areas 51 is shown in an enlarged view surrounded by chain lines in FIG. 7. Black nonrectangular areas other than the rectangular areas 51 are formed in peripheral parts of the reference wafer W1. Reference points are not set in those nonrectangular areas and the nonrectangular points are not recognized to be projected points corresponding to reference points.

Description of the construction of the controller 4 will be made again with reference to FIG. 3. An input device 45, such as a mouse or a keyboard, is connected to the bus 41. The operator operates the input device 45 to execute the setting mode or the inspection mode. Reference coordinates ($X_{wk}$, $Y_{wk}$, $Z_{wk}$ (k=1 to n, n is an integer) of points $P_{wk}$ (k=1 to n, n is an integer) corresponding to respective corners of the rectangular areas 51 in the world coordinate system can be entered by operating the input device 45. The coordinates of each reference point $P_{wk}$ entered by operating the input device 45 indicates the reference point $P_{wk}$, for example, in a state where the center of the reference wafer W1 is at the origin O of the world coordinate system and the notch N moves in the direction in which the reference wafer W1 is moved toward the camera 1 (the notch N is at an angular position of 0°). Since the reference wafer W1 is held in a horizontal position on the chuck 21, the Z-coordinate $Z_{wk}$ is 0 for all the reference points $P_{wk}$.

Figure 8:
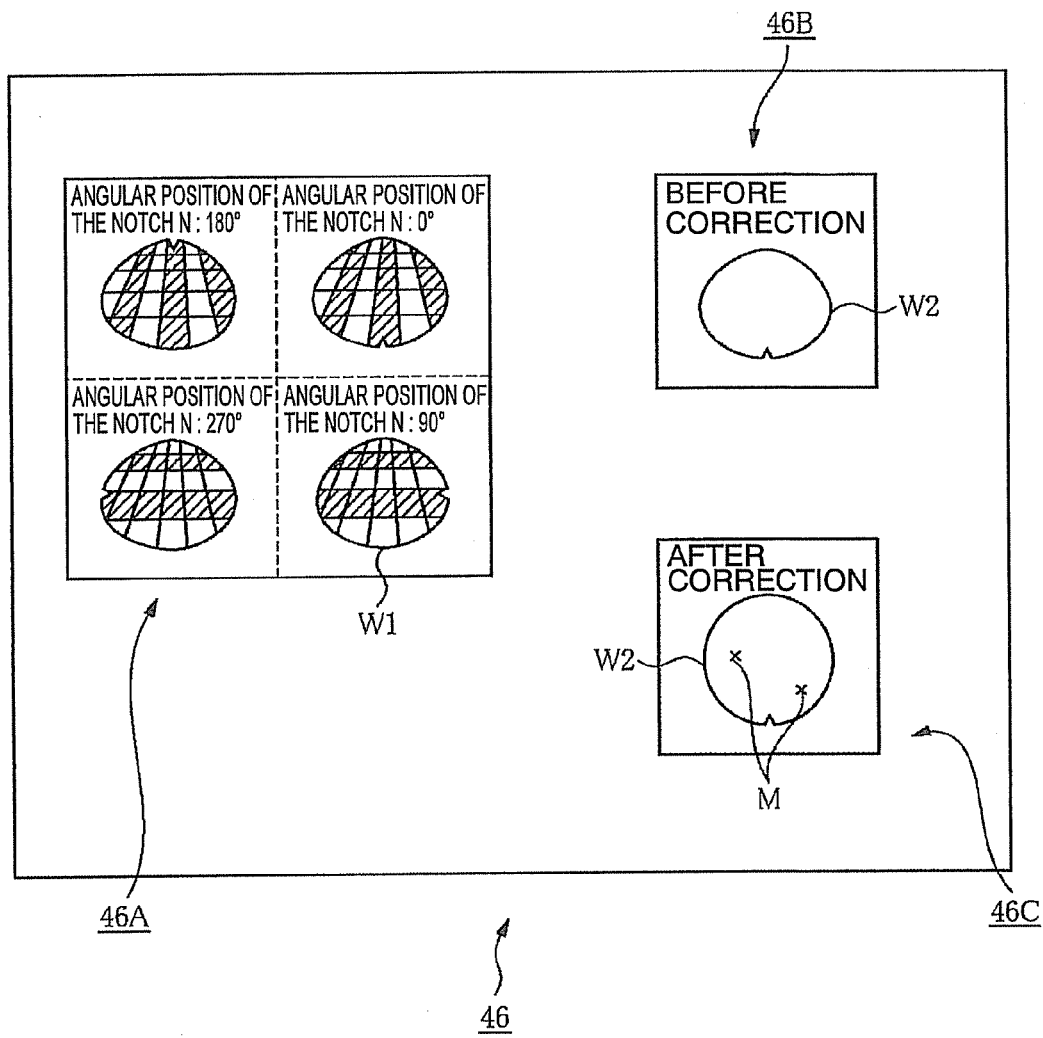
FIG. 8 is a plan view of a reference wafer.

The output screen 46, such as the screen of a display, is connected to the bus 41. FIG. 8 shows the output screen 46. The display screen has a first display area 46A, a second display area 46B and a third display area 46C. The display area 46A is used for displaying images of the reference wafer W1 formed with the notch N at different angular positions in the inspection mode.

The second display area 46B is used for displaying an image of the wafer W2 to be inspected formed when the substrate inspection system 2 is in the inspection mode. Distortion of the images of the wafers W1 and W2 attributable to the distortion of the lens 11 is corrected before displaying the images in the display areas 46A and 46B. However, as mentioned in connection with the description of the prior art, distortion attributable to the positional relation between the camera 1 and each of the wafers W1 and W2 is not corrected. The third display area 46C is used for displaying an image of the wafer W2 to be inspected obtained by correcting the distortion of the image attributable to the positional relation between the camera 1 and the objective wafer W when the inspection mode is selected.

A storage device 47 is connected to the bus 41. Parameters f, K, $s_x$, $s_y$, $c_x$ and $c_y$ for transforming coordinates in the camera coordinate system $X_c Y_c Z_c$ into those in the pixel image coordinate system rc are stored in the storage device 47. Those parameters are instrumental parameters, namely, internal parameters of the camera 1. The parameters excluding f, $c_x$ and $c_y$, which are explained above, will be explained. The parameter κ is a radial distortion coefficient, which is an optical parameter indicating the degree of radial distortion of an image on the image forming device 12 resulting from the distortion of the lens 11.

The parameters $s_x$ and $s_y$ are scale factors indicating the sizes of the pixel respectively along the u-axis and the v-axis of the image coordinate system uv on the image forming surface 13. Those parameters $s_x$ and $s_y$ are used for transforming the coordinates in the image coordinate system uv into those of the pixel image coordinate system rc. The parameters $s_x$ and $s_y$ are, for example, 14 μm.

Image data on a standard wafer W3 is stored in the storage device 47. The standard wafer W has a perfect resist pattern. The image data on the standard wafer W3 is image data on a image of a wafer W not having distortion attributable to the position and attitude of the camera 1 and the internal parameters. Unit of this image data is pixel.

A work storage device 48 for calculations is connected to the bus 41. The work storage device 48 reads the internal parameters from the storage device 47 to use the same for calculations. Values determined by calculation are stored in the work storage device 48.

A very typical explanation will be made to facilitate understanding the transformation of the coordinate system. Suppose that the coordinates X and Y of the reference point in the world coordinate system are 1.6 mm and 1.6 mm, respectively, and the coordinates of the reference point in the camera coordinate system, namely, the reference point in a plane perpendicular to the optical axis of the camera 1, are 1.5 mm and 1.5 mm, respectively. The Z coordinates in the world coordinate system and the camera coordinate system are neglected for the convenience of explanation. Since the lens 11 of the camera 1 forms a distorted image, it is supposed that the coordinates of the reference point in the image coordinate system are 1.4 mm and 1.4 mm, and are 100 and 100 in the pixel image forming surface 13 of the image forming device 12. When it is considered in the reverse way, the coordinates of the reference point in the image coordinate system are 1.4 mm and 1.4 mm when the coordinates of the reference point on the image forming device 12 is transformed into those in the image coordinate system because the dimensions of the pixels is 14 μm×14 μm when the coordinates of the reference point stored in the storage device of the controller 4 is 100 and 100. When the coordinates of the reference point in the image coordinate system are transformed by using the internal parameters, the coordinates of the reference point in the camera coordinate system are 1.5 mm and 1.5 mm.

Figure 9:
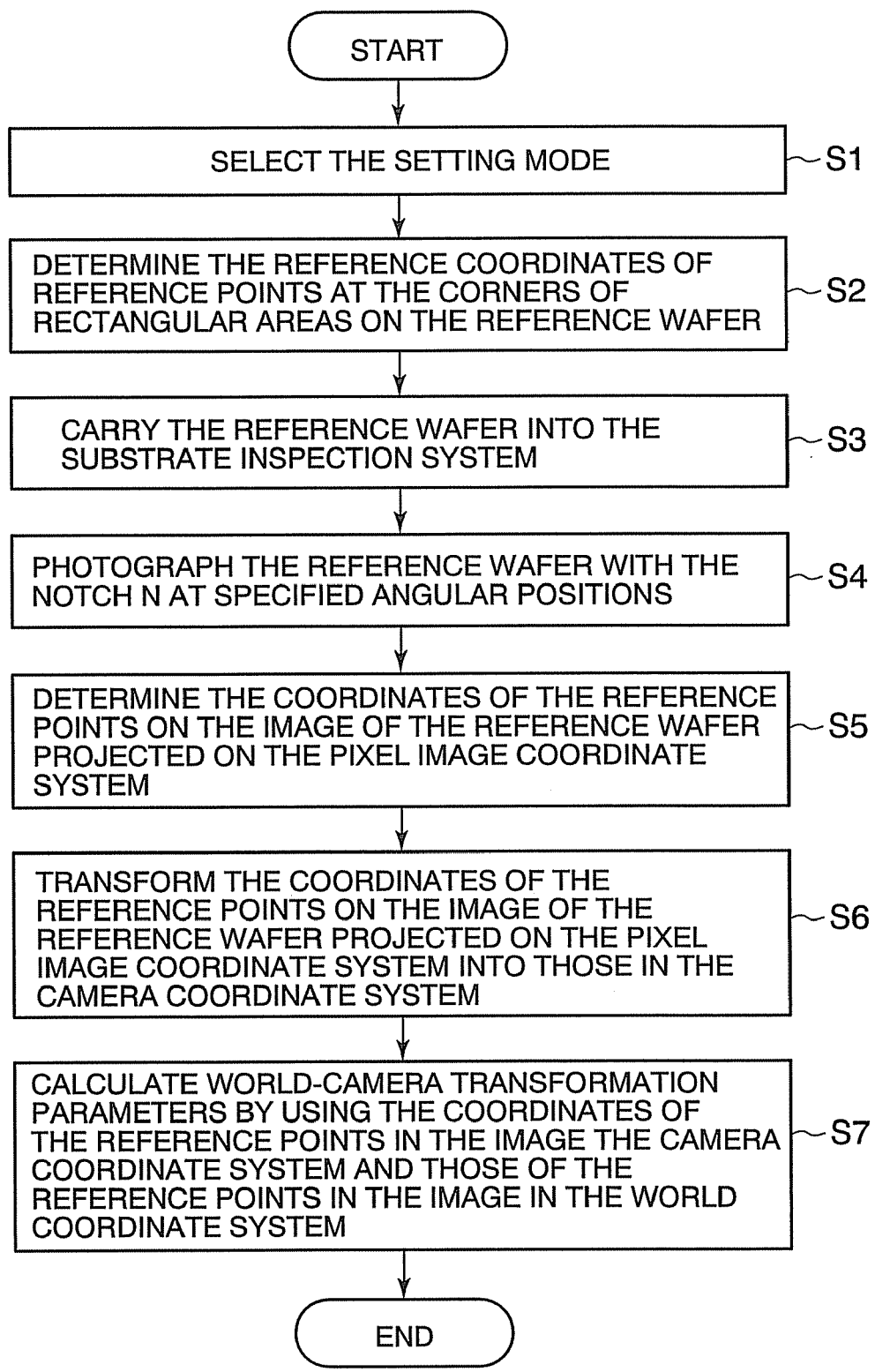
FIG. 9 is a flow chart of a substrate inspection method according to the present invention.
Figure 10:
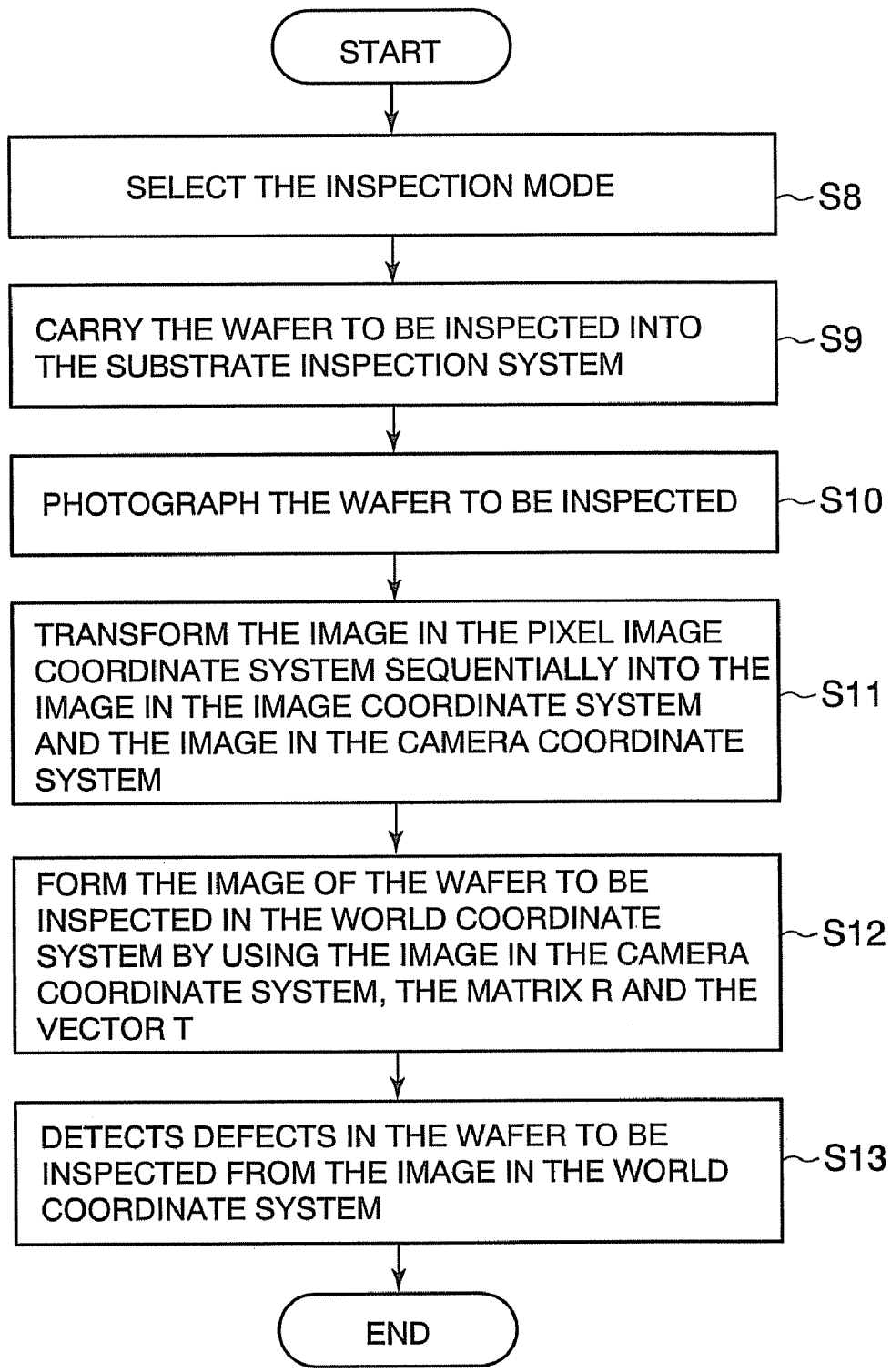
FIG. 10 is a flow chart of a substrate inspection method according to the present invention.

Procedures to be carried out by the substrate inspection system 2 will be described with reference to a flow chart of the setting mode shown in FIG. 9 and a flow chart of the inspection mode shown in FIG. 10. The camera 1 is disposed at an optional position and in an optional attitude in the substrate inspection system 2 prior to inspection. The position and attitude of the camera 1 do not need to be strictly determined; the position and attitude of the camera 1 are determined such that a wafer W can be entirely photographed.

The operator selects the setting mode displayed on the output screen 46 in step S1. The input device 45 is operated to enter the reference coordinate points $P_{wk}$ at the corners of the rectangular areas 51 on the reference wafer W1 set with the center of the reference wafer W1 at the origin O and the notch N at the angular position of 0° (six-o'clock position) as reference coordinates $(X_{wk}, Y_{wk}, Z_{wk})$ in the world coordinate system. The reference coordinates of the reference points $P_{wk}$ in the world coordinate system are stored in the work storage device 48 in one-to-one correspondence to the position of the notch N.

In step S2, the controller 4 calculates the coordinates of the corners L in the world coordinate system when the notch N is at angular positions 90° (three-o'clock position) 180° (twelve-o'clock position) and 270° (nine-o'clock position on the basis of the coordinates of the corners L when the notch N is at an angular position of the notch N stored in the work storage device 48 is 0°. The calculated coordinates are stored as reference coordinates in the work storage device 48 in one-to-one correspondence to the position of the notch N.

Figure 11A:
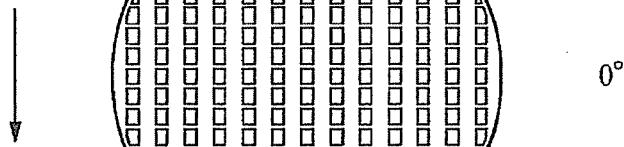
FIGS. 11A, 11B, 11C and 11D are plan views of a reference wafer at different stages of image forming process.

Then, the carrying mechanism, not shown, carries the reference wafer W1 to the chuck 21 in step S3. A central part of the back surface of the reference wafer W1 is attracted to the chuck 21 by suction. In this state, the angular position of the notch N is 0° as shown in FIG. 11A. The reference wafer W1 is moved under an illumination area 34 from a transfer position near the opening 21 and a rear position on the rear side of the illumination area 34, and the camera 1 photographs the reference wafer W1. As mentioned above, an image formed on the image forming surface 13 of the image forming device 12 in the image coordinate system uv is transformed into an image in the pixel image coordinate system rc. The image of the reference wafer W1 is displayed in the first display area 46A on the output screen 46.

Figure 11B:
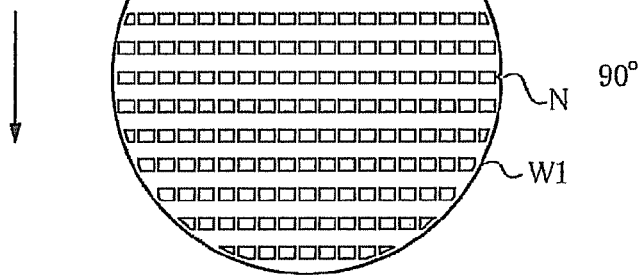

Then, the reference wafer W1 is returned to the transfer position near the 22 where the reference wafer W1 is transferred to the carrying mechanism and the reference wafer W1 is turned about a vertical axis to position the notch N at an angular position of 90° as shown in FIG. 11B. Then, the reference wafer W1 is moved rearward under the illumination area 34 and the camera 1 photographs the reference wafer W1. An image formed in the image coordinate system uv is transformed into an image in the pixel image coordinate system rc. The image of the reference wafer W1 is displayed in the first display area 46A on the output screen 46.

Figure 11C:
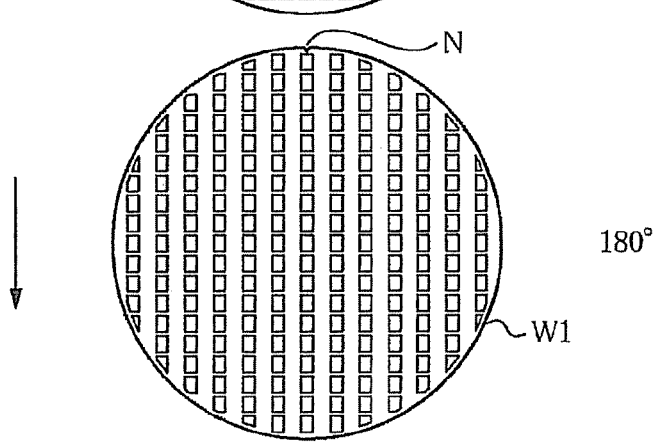
Figure 11D:
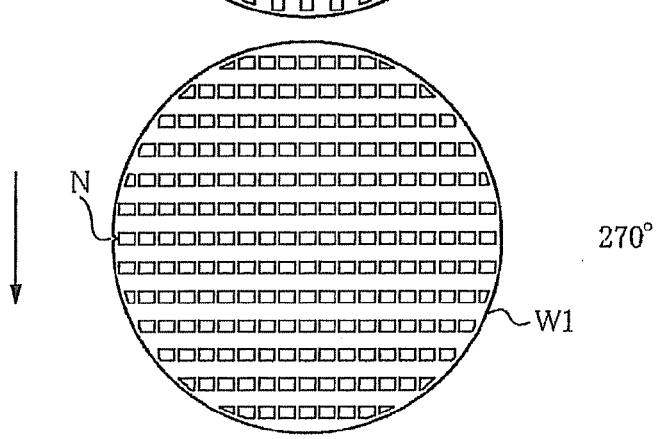

The reference wafer W1 is thus moved between the transfer position on the front side of the illumination area 34 and the rear position on the rear side of the illumination area 34. The reference wafer W1 is moved under the illumination area 34 with the notch N at an angular position of 180° as shown in FIG. 11C and the notch N at an angular position of 270° as shown in FIG. 11D. The camera 1 photographs the reference wafer W1 every time the reference wafer W is moved under the illumination area 34. Images of the reference wafer W1 thus formed are displayed in the display area 46A on the output screen 46 in step S4. After the reference wafer W1 positioned with the notch N at the angular position of 270° has been photographed, the reference wafer W1 is returned to the transfer position and the carrying mechanism carries out the reference wafer W1 from the substrate inspection system 2.

Figure 12A:
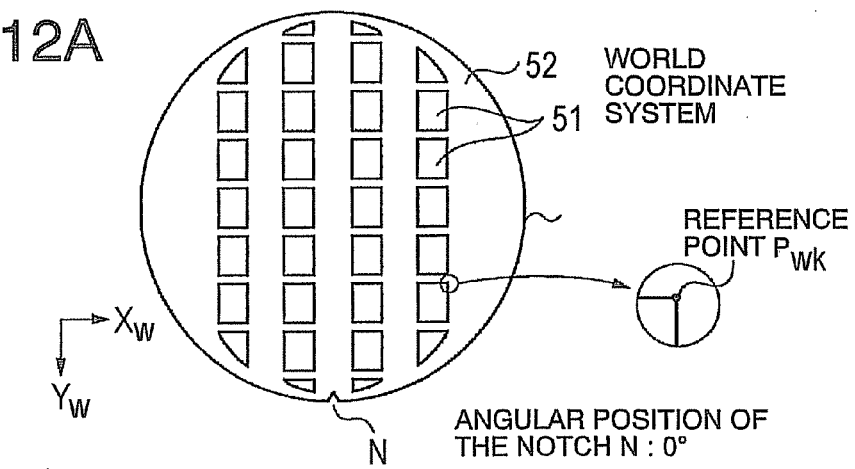
FIGS. 12A, 12B and 12C are views showing images of a reference wafer displayed in a display area in a display screen.
Figure 12B:
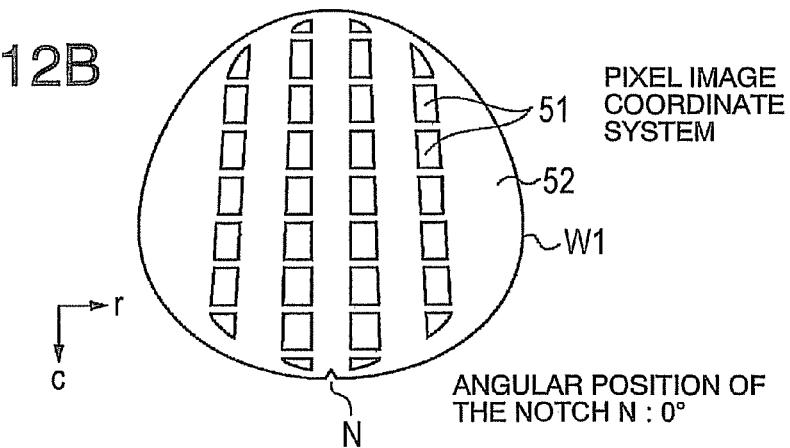

FIG. 12A shows the reference wafer W1 with the notch N at the angular position of 0° in the world coordinate system. FIG. 12B shows an image of the reference wafer W1 formed by the camera 1 and projected on the pixel image coordinate system rc. The number of the rectangular areas 51 on the reference W1 shown in FIGS. 12A and 12B is smaller than that of the rectangular areas 51 shown in FIG. 7 for the convenience of illustration. Contrast between the rectangular areas 51 and the areas 52 is a predetermined value. Therefore, Images of the rectangular areas 51 and the areas 52 of the reference wafer W are projected on the pixel image coordinate system rc in a contrast corresponding to the contrast between the rectangular areas 51 and the areas 52.

Figure 12C:
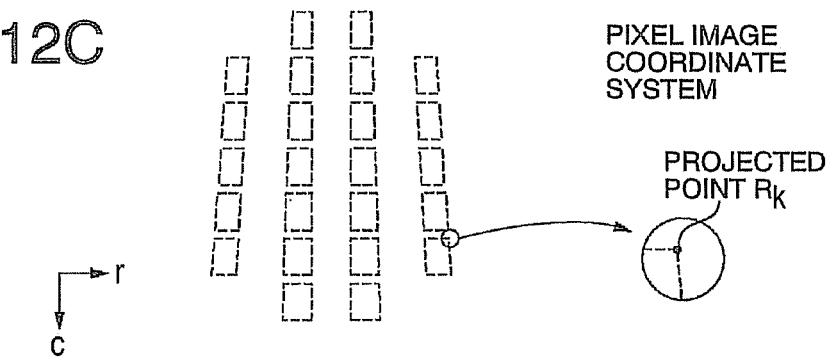

The controller 4 extracts images contrasted with surrounding areas by a contrast not lower than a threshold and examines the images to see whether or not the sizes of the images are within a predetermined range. The controller 4 recognizes the images having sizes within the predetermined range to be the images of the rectangular areas 51 and decides projected points $R_k$ corresponding to the reference points $P_{wk}$ from the shapes of the images. Then, the controller 4 assigns coordinates $(r_k, c_k)$ of the projected points $R_k$ in the pixel image coordinate system rc in step S5. Although only one of the projected points $R_k$ is shown in FIG. 12C for convenience, the coordinates $(r_k, c_k)$ of the projected points $R_k$ corresponding to the corners of all the recognized rectangular areas 51 are stored in the wok storage device 48.

The controller 4 recognizes projected points $R_k$ corresponding to the reference points $P_{wk}$ in the pixel image coordinate system rc on the reference wafer W1 set with the notch N positioned at the angular positions of 90°, 180° and 270°, and determines the coordinates $(r_k, c_k)$ of the projected points $R_k$.

Subsequently, the controller 4 transforms the coordinates $(r_k, c_k)$ of the projected points $R_k$ into the coordinates $(u'_k, v'_k)$ of the projected points $P'_k$ in the image coordinate system uv. As mentioned above, the projected points $P'_k$ are determined by correcting the displacement of points in the image coordinate system projected from the world coordinate system $X_w Y_w Z_w$ on the image coordinate system uv in attributable to the distortion of the lens 11 by using the internal parameters.
<Expression 1>

After the coordinates $(u'_k, v'_k)$ of the projected points $P'_k$ have been calculated, the controller 4 calculates the coordinates $(u_k, v_k)$ of a projected point $P_k$ of the reference points $P_{wk}$ projected from the world coordinate system $X_w Y_w Z_w$ on the image coordinate system uv by using. Expression (2). The displacement of the projected point $P_k(u_k, v_k)$ attributable to the distortion of the lens 11 is not corrected by using the internal parameters.
<Expression (2)>

The controller 4 calculates the coordinates $(X_{ck}, Y_{ak}, Z_{ck})$ of the projected points $P_{ck}$ in the camera coordinate system $X_c Y_c Z_c$ on the basis of the coordinates $(u_k, v_k)$ of the projected point $P_k$ in the image coordinate system uv by using Expression (3) in step S6.
<Expression 3>

After the coordinates $(X_{ck}, Y_{ak}, Z_{ck})$ of the projected points $P_{ak}$ in a state where the notch N is at the angular position of 0° have been calculated, the controller 4 executes steps S5 and S6 for the coordinates $(r_k, c_k)$ of projected points $R_k$ in the pixel image coordinate system rc in states where the notch N is at angular positions of 90°, 180° and 270°, converts the projected points $R_k$ into projected points $P_{ck}$ in the camera coordinate system rc and calculates the coordinates $(X_{ck}, Y_{ck}, Z_{ak})$ of the projected points $P_{ck}$ in the camera coordinate system $X_c Y_c Z_c$.

The relation between the coordinates $(X_{ck}, Y_{ck}, Z_{ck})$ of the projected points $P_{ck}$ in the camera coordinate system and the coordinates $(X_{wk}, Y_{wk}, Z_{wk})$ of the points $P_{wk}$ in the world coordinate system is expressed by Expression (4). A rotation matrix $R(\alpha, \beta, \gamma)$ is expressed by Expression (5). In Expression (4) T is a parallel displacement vector $T(t_x, t_y, t_z)$. In Expression (5), $\alpha$, $\beta$ and $\gamma$ are angular displacements about the X-axis, the Y-axis and the Z-axis, respectively, in the camera coordinate system.
<Expression (4)>
<Expression (5)>

The controller 4 applies the coordinates $(X_{wk}, Y_{wk}, Z_{wk})$ of the points $P_{wk}$ of the corners of the rectangular areas 51 in the world coordinate system $X_w Y_w Z_w$ in states where the notch N is at the angular positions 0°, 90°, 180° and 270°, and the coordinates $(X_{ck}, Y_{ck}, Z_{ck})$ in the camera coordinate system in the state where the notch N is at the angular position of 0° to Expression (4), i.e., camera-world transformation expression. Suppose that the reference points $P_{wk}$ and projected points $C_k$ in the camera coordinate system in a state where the notch N is at an angular position of no are represented by $P_{wkn}$ and $C_{kn}$, respectively. Then, the controller 4 creates Expressions (6), (7), (8) and (9).
<Expression (6)>
<Expression (7)>
<Expression (8)>
<Expression (9)>

The controller 4 calculates the values of R and T by, for example, the least-square method using Expressions (6) to (9). The calculated values of R and T are stored in the work storage device 48 in step S7. Information is displayed on the output screen 46 to the effect that the rotation matrix $R(\alpha, \beta, \gamma)$ and the parallel displacement vector $T(t_x, t_y, t_z)$ have been calculated.

Then, the operator of the substrate inspection system 2 operates the input device 45 to select the inspection mode in step S8. The wafer W2 to be inspected is carried into the substrate inspection system 2 in step S9. The wafer W2 to be inspected is held on the chuck 21 and the chuck 21 holding the wafer W2 to be inspected is moved through the illumination area 34 for photographing in step S10. An image of the wafer W2 to be inspected formed on the image forming surface 13 of the image forming device 12 in the image coordinate system uv is transformed into an image in the pixel image coordinate system rc. Thus, an image of the wafer W2 to be inspected is displayed in the second display area 46B of the output screen 46.

The controller 4 transforms the coordinates $(r_k, c_k)$ in the pixel image coordinate system rc into coordinates $(u_k, v_k)$ in the image coordinate system uv by using Expression (1) to obtain an image in the image coordinate system uv. This image in the image coordinate system is obtained by correcting distortion attributable to the distortion of the lens 11. Points in the image are transformed by using expression (2) to obtain a distorted image affected by the distortion of the lens 11. Coordinates of points in this distorted image in the image coordinate system uv are transformed into coordinates in the camera coordinate system $X_c Y_c Z_c$ by using Expression (3) to obtain an image in the camera coordinate system $X_c Y_c Z_c$ in step S11.

Calculation is executed using R and T stored in the work storage device 48 and Expression (4) to transform the coordinates in the camera coordinate system $X_c Y_c Z_c$ into those in the world coordinate system $X_w Y_w Z_w$ to obtain an image of the wafer W2 to be inspected in the world coordinate system $X_w Y_w Z_w$ in step S12.

The size of the image of the wafer W2 to be inspected in the world coordinate system is indicated in millimeters. The controller 4 changes the unit of the size of the image from millimeter to a pixel. The image of a size in pixels is displayed in the display area 46C of the output screen 46. In step S13, the controller 4 compares the transformed image of the wafer W2 to be inspected with the image data on the standard wafer W3 stored in the storage device 47, and then puts marks on the image of the wafer W2 to be inspected displayed in the third display area 46C at positions corresponding to defects in the wafer W2 to be inspected detected through the comparison. The operator of the substrate inspection system 2 may inspect the image shown in the display area 46C visually instead of the comparison of the transformed image of the wafer W2 to be inspected with the image data on the standard wafer W3 stored in the storage device 47.

The inspection method to be carried out by the substrate inspection system 2 forms an image of the reference wafer W1 having the reference points $P_{wk}$ whose coordinates in the world coordinate system are know, calculates coordinates of points in the camera coordinate system corresponding to those of the reference points $P_{wk}$, and calculates parameters for transformation between the coordinates in the camera coordinate system and those in the world coordinate system when the setting mode is selected. When the inspection mode is selected, the image of a wafer W is transformed into an image in the world coordinate system by using the parameters calculated in the setting mode, and the image is examined for inspection. The image in the world coordinate system calculated by using the parameters does not have distortion attributable to the attitude of the camera 1 and hence the wafer W2 can be accurately inspected to detect defects. Therefore, the camera 1 can be installed by simple installation work.

At least the resist pattern forming area of the objective wafer to be inspected and the reference points on the reference wafer W1 need to be photographed to carry out the substrate inspection method. Only the position of the camera 1 with respect to the $X_c$-, the $Y_c$- and the $Z_c$-axis of the camera coordinate system may be adjusted and the adjustment of the angular positions $\alpha$, $\beta$ and $\gamma$ may be omitted to set the camera 1 in an optional attitude. Although different cameras have individual characteristics represented by the internal parameters, the different cameras can be installed at the same position in the substrate inspection system 2. Consequently, load on work for installing the camera can be reduced. Even if the different cameras are installed in different substrate inspection systems by different operators, differences in images formed by the different substrate inspection systems are small. Thus, the disadvantageous effect of the differences in the characteristics of different cameras on the accuracy of inspection can be limited to a low extent.

When many substrate inspection systems 2 are used for inspection, all the substrate inspection systems 2 transform image data on a image of a photographed wafer W2 to be inspected in the image coordinate system into those on a not distorted image in the world coordinate system. Therefore, all the substrate inspection systems 2 can achieve inspection in the same accuracy when image data on the same standard wafer W3 is used. Therefore, even if an image data on the standard wafer W3 is prepared so that one special substrate inspection system 2 among the different substrate inspection systems 2 can achieve accurate inspection and the same image data on the standard wafer W is used by the other substrate inspection systems 2, the other substrate inspection systems 2 can achieve inspection in the same accuracy as the special substrate inspection system. Therefore, work for preparing reference image data individually for different substrate inspection systems 2 is not necessary. Since the accuracy of detection does not need to be lowered to prevent false detection, defects can be detected in high accuracy.

In the setting mode, the reference wafer W1 is photographed by changing the angular position of the notch N at intervals of 90° and the matrix R and the displacement vector T for transformation between the camera coordinate system and the world coordinate system are calculated on the basis of the coordinates of a reference point L on the reference wafer W1 in the image in the camera coordinate system and the coordinates of the reference point L in the world coordinate system. Therefore, increased information is necessary for determining the matrix as compared with a case where the wafer W is photographed without changing the orientation of the wafer W. Accordingly, the matrix R and the vector T can be accurately calculated and hence the distortion of the image of the wafer W2 to be inspected obtained in the inspection mode can be effectively reduced to form a corrected image. The angular displacement of the orientation of the reference wafer W1 is not limited to 90° and may be an optional angle. The number of the images of the reference wafer W1 is not limited to four.

The foregoing embodiment determines the coordinates of the four corners of each rectangular area 51 in the world coordinate system and uses those coordinates as reference coordinates. The reference coordinates are not limited to those of the four corners. For example, the coordinates of the centroid of each rectangular area 51 may be used as reference coordinates. The number of the rectangular areas 51 on the reference wafer W1 is arbitrary. A greater number of reference points is preferable because the greater the number of reference points, the higher the accuracy of calculation of the matrix R and the vector T. When the coordinates in the camera coordinate system are transformed into those in the world coordinate system, at least six reference points need to be determined because there are six unknown parameters $t_x$, $t_y$, $t_z$, $\alpha$, $\beta$ and $\gamma$.

This substrate inspection method forms rectangular areas 51 on a wafer W, determines reference points in the world coordinate system, and can determine the matrix R and the vector T by executing the foregoing steps. Since the same wafer W as the objective wafer W is used as a jig for determining the reference point. Therefore, work for carrying the jig into the substrate inspection system 2 and positioning the same in the substrate inspection system 2 is simplified and hence the steps in the setting mode can be easily carried out.

In the foregoing embodiment, the camera 1 is a pinhole camera and an image is projected on the image forming device 12 in a central projection mode. Therefore, Expression (3) is used for transformation of coordinates in the camera coordinate system $X_c Y_c Z_c$ into those in the image coordinate system uv. When a telecentric camera is used as the camera 1, an image is projected on the image forming device 12 in a parallel projection mode. Therefore, Expression (10) is used instead of Expression (3) for transformation of coordinates in the camera coordinate system $X_c Y_c Z_c$ into those in the image coordinate system uv.

<Expression 10>

In this case, $Z_{ck}$ coordinates on the $Z_c$-axis of the camera coordinate system is 0.

In the foregoing embodiment, the internal parameters of the camera 1 are stored in the storage device 47. Different internal parameters are determined for different substrate inspection systems, respectively. The internal parameters are determined by assigning optional vales to the internal parameters, photographing an optional object placed in the world coordinate system, calculating optimum values for minimizing differences between an image of the object in the world coordinate system and an image obtained by transformation using the internal parameters by, for example, a linear search method, and replacing the initial values of the internal parameters with the calculated optimum values.

Figure 13:
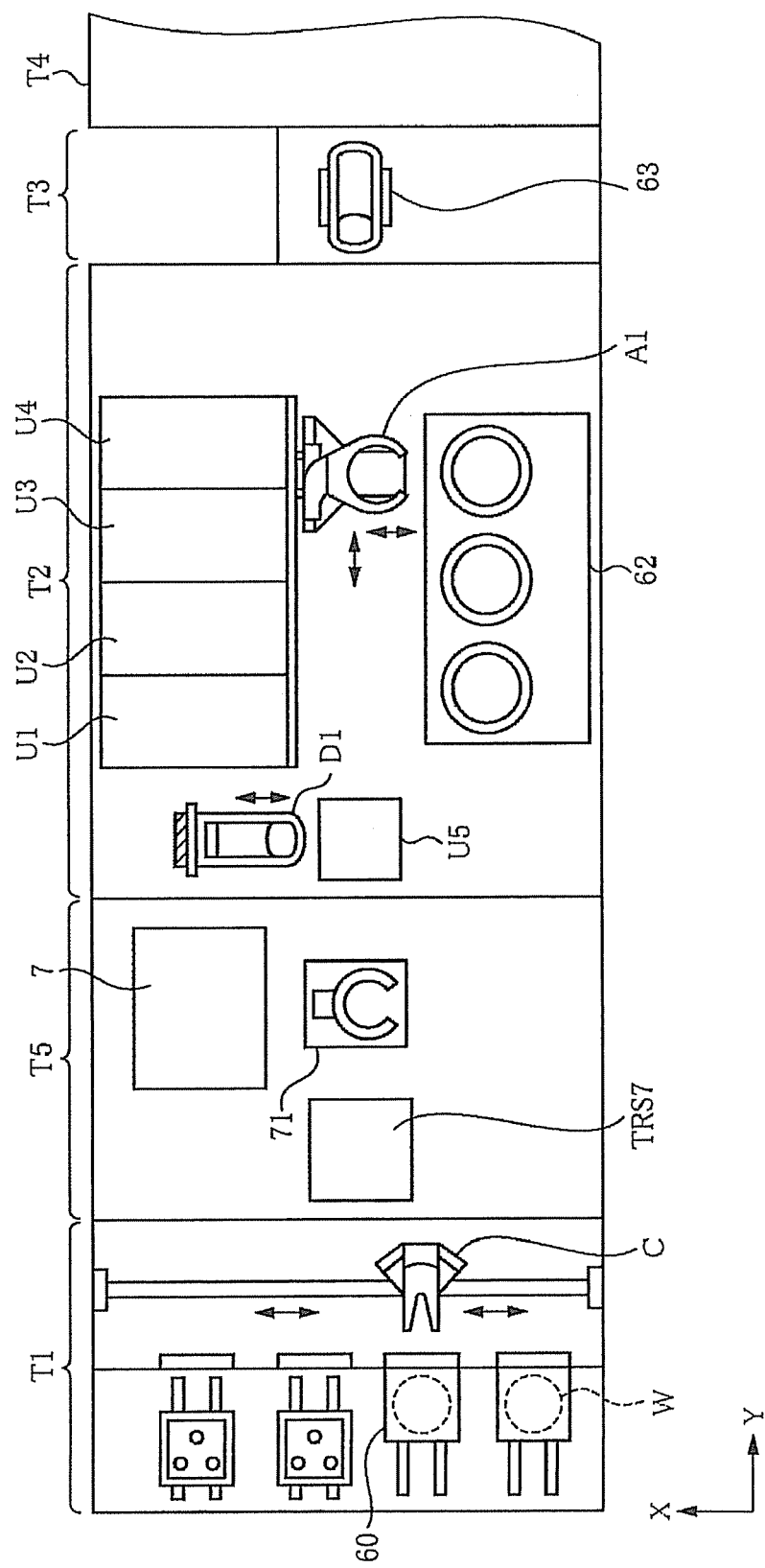
FIG. 13 is a plan view of a coating and developing system to which the substrate inspection system is applied.
Figure 14:
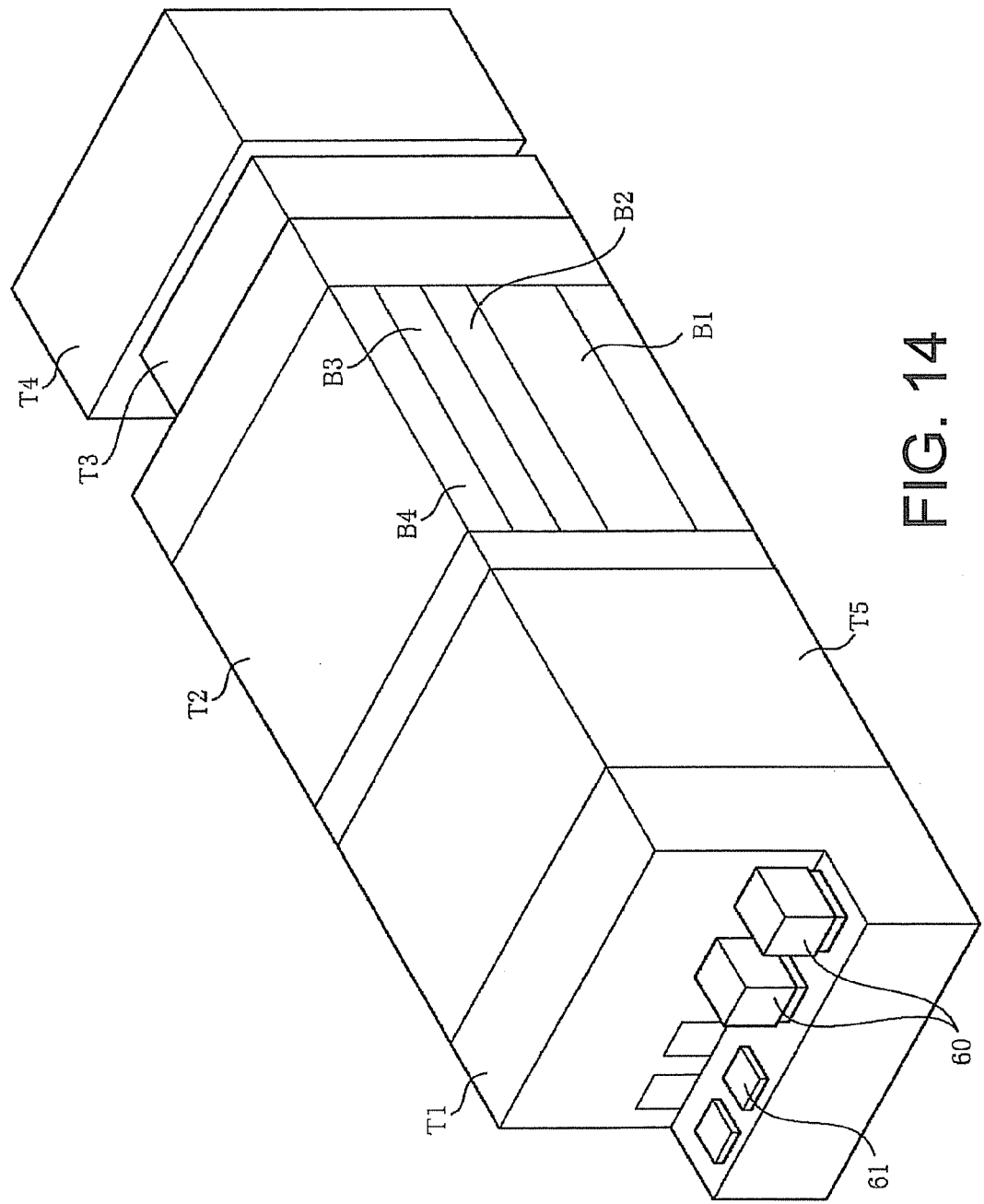
FIG. 14 is a perspective view of a resist pattern forming system built by combining a exposure system with the coating and developing system shown in FIG. 13.
Figure 15:
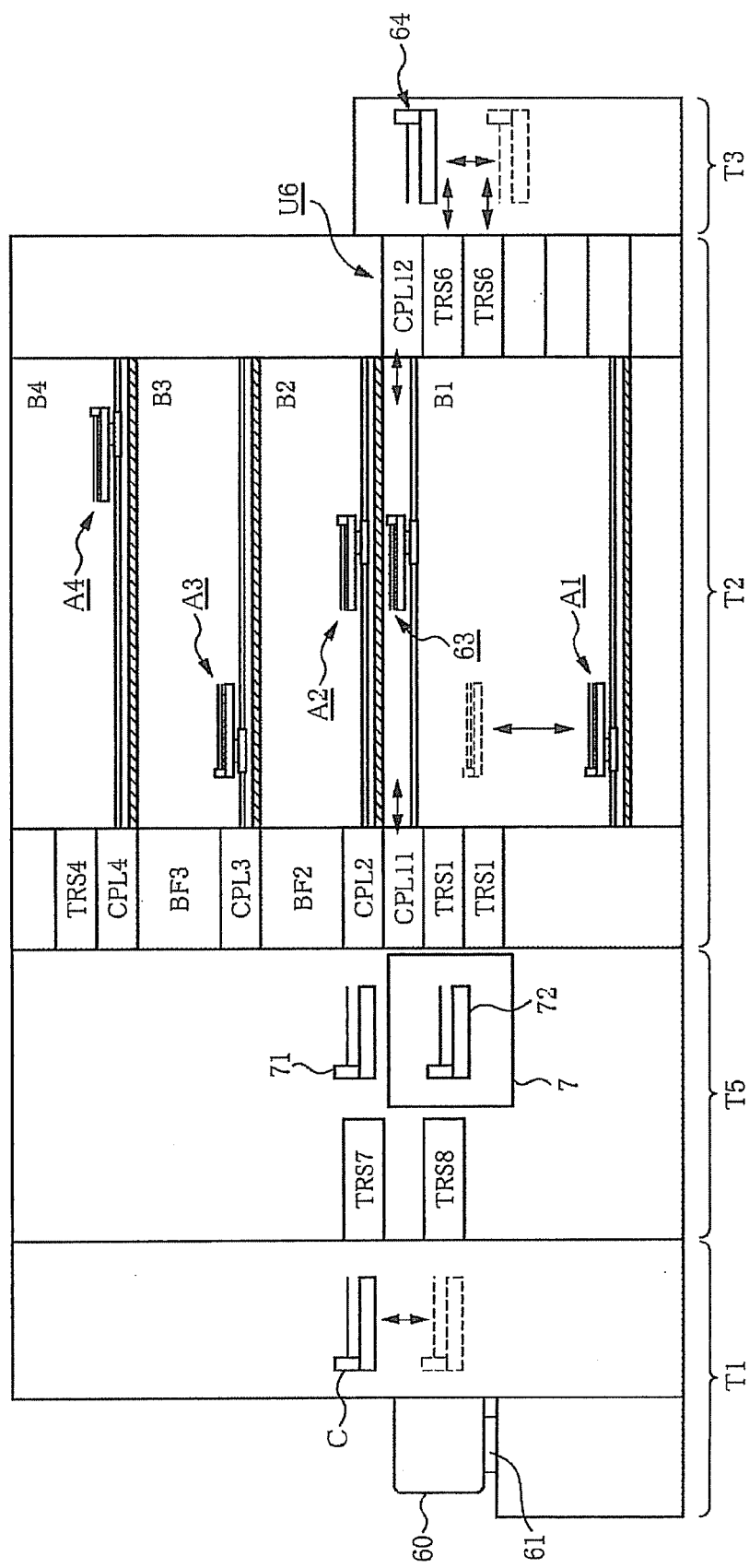
FIG. 15 is a longitudinal sectional view of the coating and developing system shown in FIG. 13.
Figure 16:
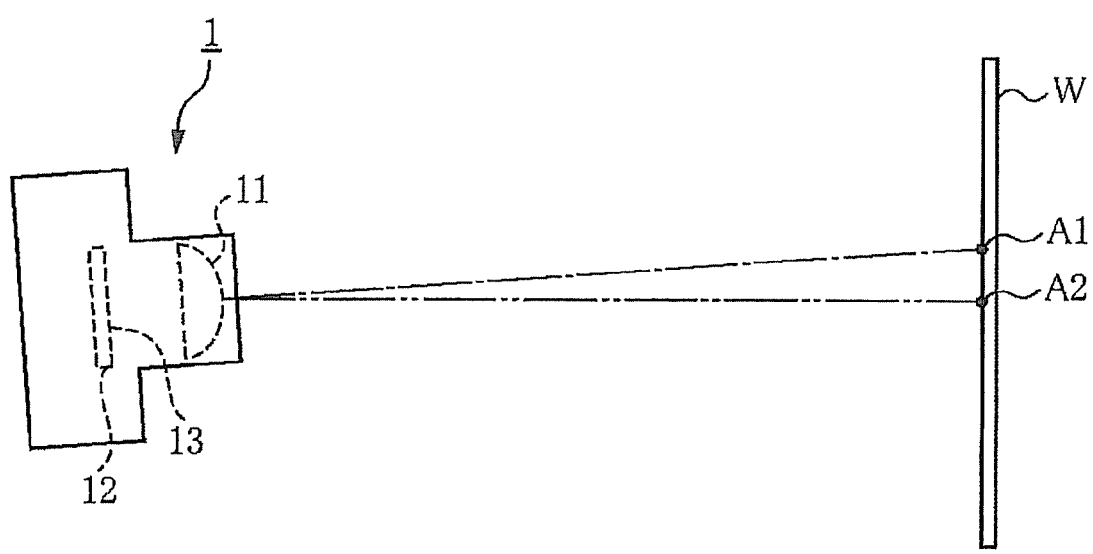
FIG. 16 is a view of assistance in explaining the relation between the attitude of a camera and a wafer.
Figure 17:
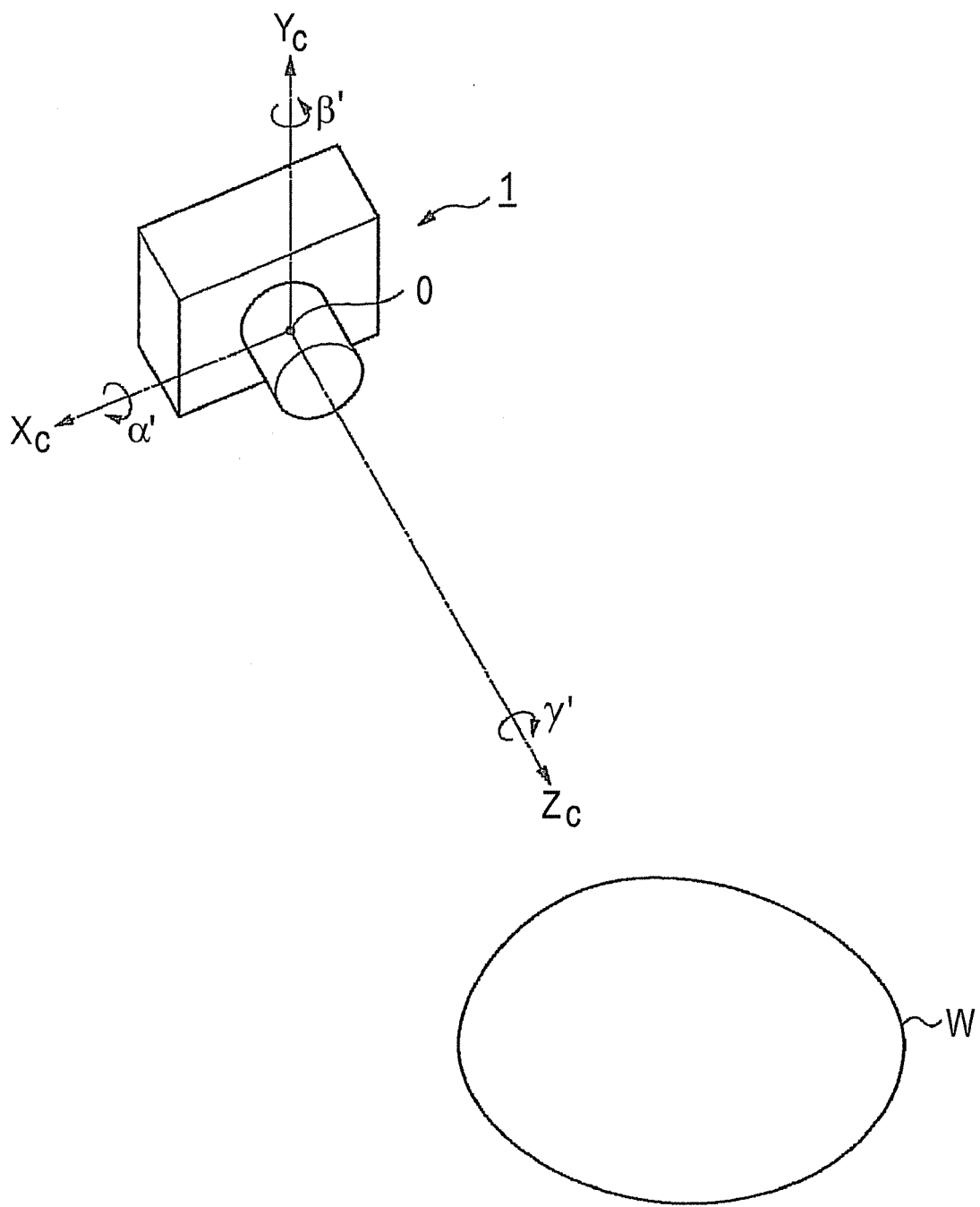
FIG. 17 is a view of assistance in explaining the relation between the attitude of a camera and a wafer.

A resist pattern forming system formed by combining a coating and developing system including the substrate inspection system, and an exposure system T4 will be briefly described by way of example. FIG. 13 is a plan view of a coating and developing system, FIG. 14 is a perspective view of a resist pattern forming system built by combining a exposure system with the coating and developing system shown in FIG. 13, and FIG. 15 is a longitudinal sectional view of the coating and developing system. The coating and developing system has a carrier block T1. In the carrier block T1, a transfer arm C takes out a wafer W from a closed-type carrier 60 placed on a table 61. A wafer W taken out from the carrier 60 is transferred through an inspection block T5 contiguous with the carrier block T1 to a processing block T2. The transfer arm C receives a wafer processed in the processing block T2 and inspected in the inspection block T5 and returns the wafer to the carrier 60.

As shown in FIG. 15, the inspection block T5 is provided with a transfer units TRS7 and TRS8, an inspection module 7 corresponding to the foregoing substrate inspection system 2, a transfer arm 71 for transferring a wafer W between the transfer unit TRS7 and the processing block T2, and a transfer arm 72 for transferring a wafer W between the transfer unit TRS8 and the inspection module 7 and between the processing block T2 and the inspection module 7.

As shown in FIG. 14, the processing block T2 has a first block 81 for carrying out a developing process, namely, a DEV layer B1, a second block B2 for carrying out a lower antireflection film forming process for forming a lower antireflection film under a resist film, namely, a BCT layer B2, a third block 83 for carrying out a coating process for coating a wafer W with a liquid resist, namely, a COT layer B3, and a fourth block 84 for carrying out an upper antireflection film forming process for forming an upper antireflection film over a resist film, namely, a TCT layer B4.
The first block 81, the second block B2, the third block B3 and the fourth block 84 are stacked upward in that order.

Each of the second block (BCT layer) 82 and the fourth block (TCT layer) 84 is provided with a wet-processing module 62 including three coating units for coating a wafer with a chemical solution for forming an antireflection film by a spin-coating method, heating and cooling units for carrying out a pretreatment process and a post-treatment process before and after processing the wafer W in the wet-processing module 62, respectively, and carrying arms A2 and A4 disposed between the wet-processing module and the processing units to carry a wafer W to and from the wet-processing module and the processing units. The third block (COT layer) 83 is similar in construction to the second block B2 and the fourth block 84, except that the third block B3 uses a resist solution as the chemical solution and is provided with a hydrophobicity-imparting unit. The first block (DEV layer) B1 is provided, for example, with two developing units stacked in two layers, and a carrying arm for carrying a wafer @ to the developing units. The processing block T2 includes a shelf unit U5 as shown in FIGS. 13 and 15, and a vertically movable transfer arm D1 disposed near the shelf unit U5 to carry a wafer to and from the modules of the shelf unit U5.

In, the reference wafer W1 is carried from the carrier 60 via the transfer arm C, the transfer unit TRS8, the transfer arm 72, the inspection module 7 and the transfer unit TRS7 to the transfer arm C in the coating and developing system and the reference wafer W1 is returned to the carrier 60 when the setting mode is selected.

When the inspection mode is selected, an wafer W2 to be inspected to be inspected is carried from the carrier 60 via the transfer arm C, the transfer unit TRS7 and the transfer arm 71 to one of the transfer unit of the shelf unit U5, for example, the a transfer unit CPL2 corresponding to the second block (BCT layer) B2. Then, the objective wafer W1 is carried via the transfer arm D1, a transfer unit CPL3 and the transfer arm A3 to the third block (COT layer) B3. Then, the surface of the wafer W2 to be inspected is processed by a hydrophobicity-imparting process by the hydrophobicity-imparting unit and a resist film is formed on the wafer W2 to be inspected by the wet-processing module. After the resist film has been formed on the wafer W2 to be inspected, the carrying arm A3 carries the wafer W2 to be inspected to a transfer unit BF3 of the shelf unit U5.

Then, the wafer W2 to be inspected is transferred from the transfer unit BF3 via the transfer arm D1 and a transfer unit CPL4 to the carrying arm A4. the carrying arm A4 carries the wafer W2 to be inspected having an antireflection film coating the resist film to a transfer unit TRS4. In some cases, the resist film is not coated with an antireflection film or the second block (BCT layer) B2 forms an antireflection film instead of processing the wafer W2 to be inspected by the hydrophobicity-imparting process.

A shuttle arm 63 is installed in an upper part of the first block (DEV layer) B1. The shuttle arm 63 is used specially for directly carrying a wafer W from a transfer unit CPL11 in the shelf unit U5 to a CPL12 in a shelf unit U6. The transfer arm D1 carries the wafer W2 to be inspected provided with the resist film and the antireflection film via the transfer units BF3 and TRS4 to the transfer unit CPL11. Then, the shuttle arm 63 carries the wafer W2 to be inspected directly to the transfer unit CPL12 in the shelf unit U6 and the wafer W2 to be inspected is transferred to an interface block T3. The transfer units CPL 2, CPL3, CPL4 and CPL11 shown in FIG. 15 serve also as temperature-adjusting cooling units. The transfer units BF2 and BF3 shown in FIG. 15 serve also as buffer units capable of holding a plurality of wafers W.

Then, an interface arm 64 carries the wafer W2 to be inspected to the exposure system T4. After being processed by a predetermined exposure process in the exposure system T4, the wafer W2 to be inspected is returned through the transfer unit TRS6 of the shelf unit U6 to the processing block T2. Then, the wafer W2 to be inspected is processed by a developing process in the first block (DEV layer) B1. Then, the carrying arm A1 transfers the wafer W2 to be inspected from the first block (DEV layer) B1 to a transfer unit TRS1. Subsequently, the wafer W2 to be inspected is carried to the inspection module 7 and the transfer unit TRS8 in that order, and then, the transfer arm C returns the wafer W2 to be inspected to the carrier 60. Units U1 to U4 shown in FIG. 13 are processing units each including heating modules and cooling modules stacked in layers.

What is claimed is:

1. A substrate inspection method using a substrate inspection system including a camera provided with an image forming device for forming an image of a substrate to be inspected to be inspected, and a table for supporting the substrate to be inspected for photographing by the camera, said substrate inspection method comprising the steps of:
    determining coordinates of reference points represented by known coordinates in a three-dimensional world coordinate system in a jig mounted on the table in an pixel image coordinate system specified by pixels arranged in a matrix in the image forming device by forming an image of the jig by the camera;
    transforming the coordinates of the reference points in the pixel image coordinate system on the basis of the length and width of the pixels into coordinates in a two-dimensional image coordinate system on an image formed by the camera;
    transforming the coordinates of the reference points in the two-dimensional image coordinate system into coordinates in a three-dimensional camera coordinate system on the camera by correcting the coordinates of the reference points by using device parameters including parameters of an optical system included in the camera;
    calculating world-camera coordinate transformation parameters including displacements of the camera coordinate system from the world coordinate system in an X-, a Y- and a Z-direction and angular displacements about an X-, a Y- and a Z-axis on the basis of coordinates of at least six reference points in the camera coordinate system determined by the preceding steps, coordinates of the reference points in the world coordinate system and a world-camera coordinate transformation expression;

obtaining image data in the pixel image coordinate system by photographing a substrate to be inspected placed on the table;

transforming the image data in the pixel image coordinate system obtained by the preceding step into image data in the two-dimensional image coordinate system on the basis of the length and width of the pixels, transforming the image data in the two-dimensional image coordinate system into image data in the camera coordinate system on the basis of the device parameters, and transforming the image data in the camera coordinate system in the camera coordinate system into image data in the world coordinate system by using the camera-world coordinate transformation expression and the transformation parameters; and inspecting the substrate to be inspected on the basis of the image data in the world coordinate system.

2. The substrate inspection method according to claim 1, wherein the jig is a correcting substrate having a surface provided with the reference points.

3. The substrate inspection method according to claim 2, further comprising the steps of turning the correcting substrate to change the angular position from a first angular position to a second angular position after photographing the correcting substrate at the angular position; and photographing the correcting substrate set at the second position;

wherein the coordinates of the reference points in the world coordinate system when the substrate is at the first angular position and when the substrate is at the second angular position are known, and the steps of determining coordinates of the reference points in the pixel image coordinate system when the substrate is at the first position and when the substrate is at the second angular position, transforming those coordinates of the reference points into coordinates in the two-dimensional image coordinate system, and transforming the coordinates of the reference points in the two-dimensional image coordinate system into coordinates in the camera coordinate system are executed, and the transformation parameters are calculated by using the coordinates of the reference points in the camera coordinate system and the coordinates of the reference points in the world coordinate system.

4. A storage medium storing a computer program to be executed by the substrate inspection system to inspect a substrate, wherein the computer program has a set of instructions for a computer to execute to carry out the substrate inspection method stated in claim 1.

5. A substrate inspection system for inspecting a substrate to be inspected to be inspected, said substrate inspection system comprising:

a camera provided with an image forming device; and a table for supporting a substrate to be inspected to be inspected thereon for photographing by the camera;

wherein the substrate inspection system carries out a substrate inspection method comprising the steps of:

determining coordinates of reference points represented by known coordinates in a three-dimensional world coordinate system in a jig mounted on the table in an pixel image coordinate system specified by pixels arranged in a matrix in the image fanning device by forming an image of the jig by the camera;

transforming the coordinates of the reference points in the pixel image coordinate system on the basis of the length and width of the pixels into coordinates in a two-dimensional image coordinate system on an image formed by the camera;

transforming the coordinates of the reference points in the two-dimensional image coordinate system into coordinates in a three-dimensional camera coordinate system on the camera by correcting the coordinates of the reference points by using device parameters including parameters of an optical system included in the camera;

calculating world-camera coordinate transformation parameters including displacements of the camera coordinate system from the world coordinate system in an X-, a Y- and a Z-direction and angular displacements about an X-, a Y- and a Z-axis on the basis of coordinates of at least six reference points in the camera coordinate system determined by the preceding steps, coordinates of the reference points in the world coordinate system and a world-camera coordinate transformation expression;

obtaining image data in the pixel image coordinate system by photographing a substrate to be inspected placed on the table;

transforming the image data in the pixel image coordinate system obtained by the preceding step into image data in the two-dimensional image coordinate system on the basis of the length and width of the pixels, transforming the image data in the two-dimensional image coordinate system into image data in the camera coordinate system on the basis of the device parameters, and transforming the image data in the camera coordinate system in the camera coordinate system into image data in the world coordinate system by using the camera-world coordinate transformation expression and the transformation parameters; and inspecting the substrate to be inspected on the basis of the image data in the world coordinate system.

6. The substrate inspection system according to claim 5, wherein the jig is a correcting substrate having a surface provided with the reference points.

7. The substrate inspection system according to claim 6, which executes the steps of turning the correcting substrate to change the angular position thereof from an initial position to a new angular position after photographing the correcting substrate;

photographing the correcting substrate set at the new angular position;

the coordinates of the reference points in the world coordinate system when the substrate is at the first angular position and when the substrate is at the second angular position being known;

determining coordinates of the reference points in the pixel image coordinate system when the substrate is at the initial position and when the substrate is at the new angular position;

transforming those coordinates of the reference points into coordinates in the two-dimensional image coordinate system;

transforming the coordinates of the reference points in the two-dimensional image coordinate system into those in the camera coordinate system; and the transformation parameters are calculated by using the coordinates of the reference points in the camera coordinate system and those of the reference points in the world coordinate system.

8. A storage medium storing a computer program to be executed by the substrate inspection system to inspect a substrate, wherein the computer program has a set of instructions for a computer to execute to carry out the substrate inspection method stated in claim 2.

9. A storage medium storing a computer program to be executed by the substrate inspection system to inspect a substrate, wherein the computer program has a set of instructions for a computer to execute to carry out the substrate inspection method stated in claim 3.

* * * * *